(12) United States Patent
Sato et al.

(10) Patent No.: US 12,196,275 B2
(45) Date of Patent: Jan. 14, 2025

(54) PROPELLER SHAFT AND PRODUCTION METHOD THEREFOR

(71) Applicant: HITACHI ASTEMO, LTD., Hitachinaka (JP)

(72) Inventors: Shinichi Sato, Hitachinaka (JP);
Toshiyuki Masuda, Hitachinaka (JP);
Kenichiro Ishikura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 418 days.

(21) Appl. No.: 17/634,099

(22) PCT Filed: Jul. 30, 2020

(86) PCT No.: PCT/JP2020/029219
§ 371 (c)(1),
(2) Date: Feb. 9, 2022

(87) PCT Pub. No.: WO2021/029228
PCT Pub. Date: Feb. 18, 2021

(65) Prior Publication Data
US 2022/0349447 A1    Nov. 3, 2022

(30) Foreign Application Priority Data
Aug. 14, 2019  (JP) ................. 2019-148706

(51) Int. Cl.
*F16D 3/84*   (2006.01)
*B60K 17/22*  (2006.01)
(Continued)

(52) U.S. Cl.
CPC .............. *F16D 3/841* (2013.01); *B60K 17/22* (2013.01); *F16D 3/845* (2013.01); *F16J 15/52* (2013.01); *F16J 3/042* (2013.01)

(58) Field of Classification Search
CPC ......... F16D 3/841; F16D 3/845; B60K 17/22; F16J 15/52; F16J 3/042
(Continued)

(56) References Cited

U.S. PATENT DOCUMENTS 1,183,064 A  *  5/1916  Emerson ............... F16D 3/2052
464/175
1,381,155 A  *  6/1921  Wood ....................... F16D 3/62
464/175
(Continued)

FOREIGN PATENT DOCUMENTS

DE   10 2007 034 760 A1   2/2009
GB      2 287 071 A        9/1995
(Continued)

OTHER PUBLICATIONS

Extended European Search Report dated Sep. 15, 2022 issued in EP Application No. 20852744.0, 10 pages.
(Continued)

*Primary Examiner* — Greg Binda
(74) *Attorney, Agent, or Firm* — FOLEY & LARDNER LLP

(57) ABSTRACT

Propeller shaft has boot member (7) whose one end is fixed to sleeve shaft (2) and whose other end is fixed to stub shaft (3), and boot bands (8) fixing boot member (7) to sleeve shaft (2) and stub shaft (3). Protrusions (74) fitted in respective fitting grooves (26) formed on outer circumferential surfaces of sleeve shaft (2) and stub shaft (3) are provided on inner circumferential sides of one end and the other end of the boot member (7). At each of sleeve shaft (2) and stub shaft (3), first outer diameter section (231) having diameter larger than an inside diameter (D1) of protrusion (74) is provided at one side with respect to fitting groove (26), also second outer diameter section (232) having diameter larger than an outside diameter (X1) of first outer
(Continued)

diameter section (231) is provided at the other side with respect to fitting groove (26).

12 Claims, 11 Drawing Sheets

(51) Int. Cl.
*F16J 15/52* (2006.01)
*F16J 3/04* (2006.01)

(58) Field of Classification Search
USPC .......................................................... 464/175
See application file for complete search history.

(56) References Cited

U.S. PATENT DOCUMENTS

| | | | | |
|---|---|---|---|---|
| 4,735,596 | A * | 4/1988 | Ukai | ...................... F16D 3/845 |
| | | | | 464/175 |
| 5,176,390 | A | 1/1993 | Lallement | |
| 6,558,262 | B1 | 5/2003 | Breidenbach et al. | |
| 10,550,894 | B2 * | 2/2020 | Takabe | ....................... F16J 3/04 |
| 11,181,150 | B2 * | 11/2021 | Tomogami | .............. F16D 1/116 |
| 2010/0197413 | A1 | 8/2010 | Takabe | |

FOREIGN PATENT DOCUMENTS

| | | |
|---|---|---|
| JP | 62-138917 U | 9/1987 |
| JP | H05-087254 A | 4/1993 |
| JP | H06-341551 A | 12/1994 |
| JP | H07-042841 A | 2/1995 |
| JP | H07-269708 A | 10/1995 |
| JP | 2000-205291 A | 7/2000 |
| JP | 2005-036945 A | 2/2005 |
| JP | 2008-115999 A | 5/2008 |
| JP | 2009-068510 A | 4/2009 |
| JP | 2010-112474 A | 5/2010 |

OTHER PUBLICATIONS

International Search Report dated Sep. 24, 2020 issued in International Application No. PCT/JP2020/029219, with English translation, 7 pages.
Notification concerning Transmittal of Copy of International Preliminary Report on Patentability dated Feb. 24, 2022 issued by the International Bureau of WIPO in International Application No. PCT/JP2020/029219, with English translation, 14 pages.

* cited by examiner

PROPELLER SHAFT AND PRODUCTION METHOD THEREFOR

TECHNICAL FIELD

This invention relates to a propeller shaft and manufacturing method thereof.

BACKGROUND ART

A propeller shaft described in a following patent document 1 and so on has been known as a conventional propeller shaft.

That is, this propeller shaft includes a first shaft portion connected to a transmission of a vehicle; and a second shaft portion connected to a differential of the vehicle. The first shaft portion and the second shaft portion are connected by a spline connection to be relatively moved in the axial direction. A first end portion of a boot member is fixed on an outer circumference side of the first shaft portion through a boot band. A second end portion of the boot member is fixed on an outer circumference side of the second shaft portion through a boot band. With this, the boot bands liquid-tightly protect the connection portion between the first shaft portion and the second shaft portion. In particular, the boot member includes annular protruding portions protruding from inner circumference sides of end portions. The boot member is tightened from outer circumference sides by the boot bands in a state in which the protruding portions are mounted in annular mounting grooves provided on outer circumference surfaces of the first and second shaft portions.

PRIOR ART DOCUMENT

Patent Document

Patent Document 1: Japanese Patent Application Publication No. 2000-205291

SUMMARY OF THE INVENTION

Problems which the Invention is Intended to Solve

However, in the above-described propeller shaft, outside diameters of each of the first and second shaft portions are set to the same diameter on the front and rear sides of the mounting grooves in an insertion direction of the boot member. Accordingly, when the boot member is inserted into one of the first and second shaft portions, an inside diameter of the boot member needs to be expanded by a protruding amount of the protruding portion. With this, the workability of the assembling operation is deteriorated.

On the other hand, it is conceivable that the outside diameters on the front and rear sides of the mounting groove is decreased for decreasing the insertion load of the boot member. However, in this case, for example, the protruding portion may get over the mounting groove by the decrease of the outside diameters on the front and rear sides of the mounting groove. Consequently, the protruding portion is difficult to be mounted in the mounting groove. The assembling workability is deteriorated in the different view point of the case in which the first and second shaft portions are set to be appropriate outside diameters.

It is, therefore, an object of the present invention to provide a propeller shaft and a manufacturing method thereof devised to solve the above-described problems of the technical problems of the conventional propeller shaft, and to improve a workability of an insertion of a boot member with respect to a shaft portion.

Means for Solving the Problem

In one aspect according to the present invention, in the shaft portion, an outside diameter on a front side of the mounting groove (a front side in the insertion direction of the boot member) is set to be relatively smaller than an outside diameter on a back side of the mounting groove (a back side in the insertion direction of the boot member).

Benefit of the Invention

By the present invention, it is possible to improve the workability of the insertion of the boot member with respect to the shaft portion.

BRIEF DESCRIPTION OF DRAWINGS

FIG. 4 are longitudinal sectional view showing a main part of the propeller shaft. FIG. 4($a$) is a first process. FIG. 4($b$) is a second process. FIG. 4($c$) is a third process.

DESCRIPTION OF EMBODIMENTS

Figure 1:
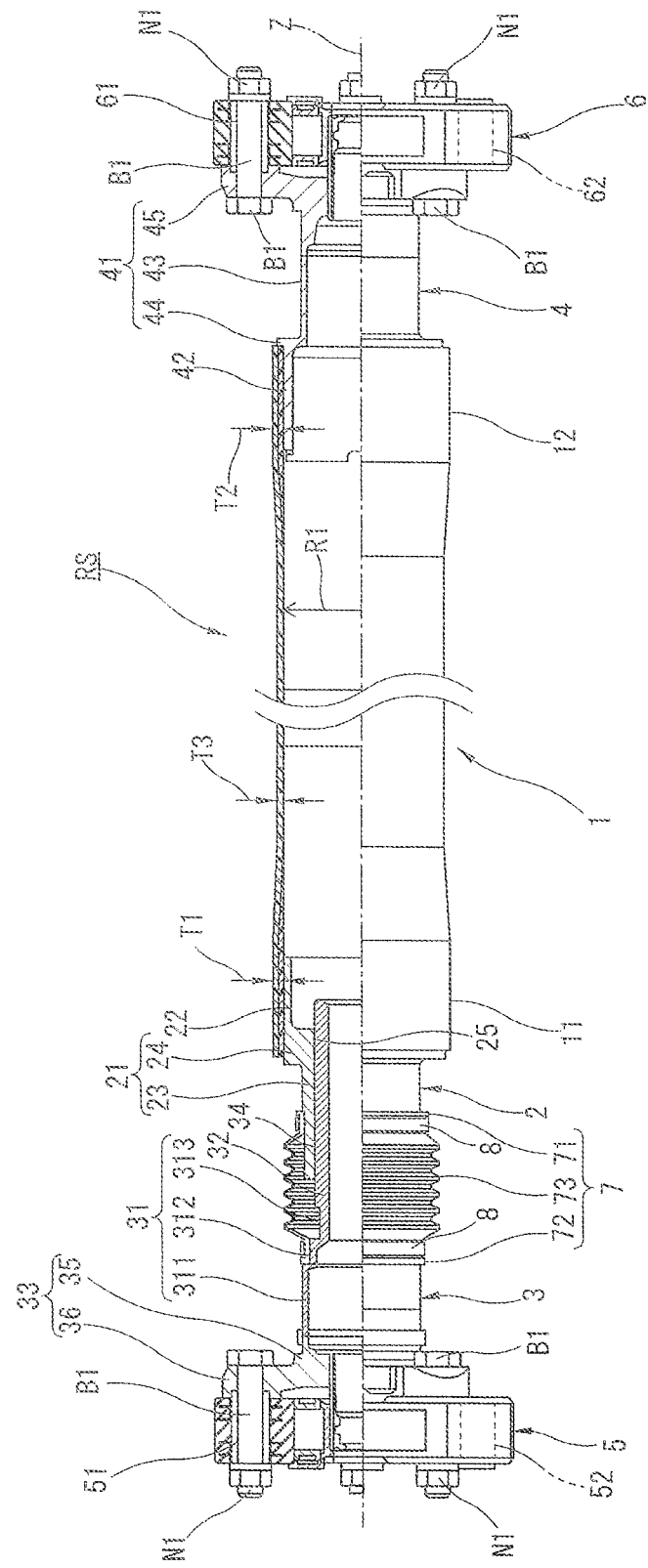
FIG. 1 is a half sectional view showing an entire propeller shaft according to the present invention.

A propeller shaft according to embodiments of the present invention are explained in detail with reference to the drawings. Besides, in below-described explanations, the propeller shaft according to the embodiments are applied to a propeller shaft for a vehicle, similarly to the conventional art. Moreover, for the explanations, a left side in FIG. 1 is represented as "front", and a right side in FIG. 1 is represented as "rear". A direction along a rotation axis Z in FIG. 1 is represented as "axial direction". A direction perpendicular to the rotation axis Z is represented as "radial direction". A direction around the rotation axis Z is represented as "circumferential direction".

(Configuration of Propeller Shaft)

Figure 2:
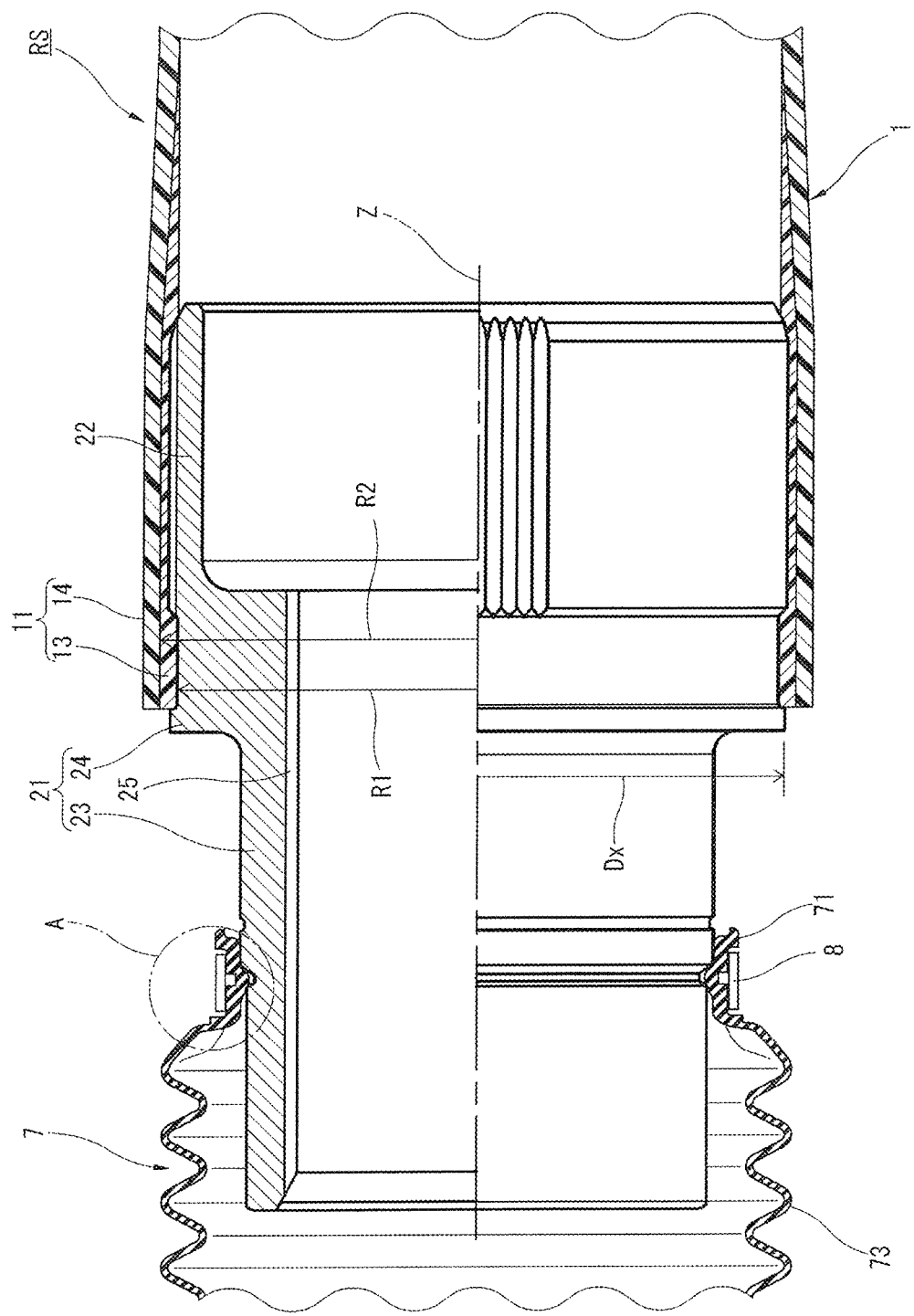
FIG. 2 is a half longitudinal sectional view showing a first collar member shown in FIG. 1.

FIG. 1 is a view showing an overall configuration of the propeller shaft PS according to a first embodiment of the present invention. A half part of FIG. 1 is an axially sectional view of the propeller shaft PS. FIG. 2 is an enlarged sectional view showing a portion near a connection portion between a sleeve shaft 2 and a stub shaft 3 of the propeller shaft PS shown in FIG. 1. Besides, in FIG. 2, the only sleeve shaft 2 is shown by a half section for the explanations.

As shown in FIG. 1, the propeller shaft PS is disposed along forward and rearward directions of the vehicle between a first shaft (not shown) disposed on a front side of the vehicle, and a second shaft (not shown) disposed on a rear side of the vehicle. In case of the vehicle of an FR (Front Engine/Rear Drive) type, the first shaft portion corresponds to an output shaft of a transmission which is disposed on the front side of the vehicle, and to which a rotational force is transmitted from a driving force such as an engine and a motor. The second shaft corresponds to an input shaft of a differential which is disposed on the rear side of the vehicle, and which is configured to transmit the rotation force to wheels of the vehicle.

That is, the propeller shaft PS according to the embodiments is a propeller shaft having one piece configuration. The front end side is connected through a first coupling member 5 to the first shaft portion. The rear end side is connected through a second coupling member 6 to the second shaft portion. More specifically, the propeller shaft PS includes a cylindrical tube 1 opened on both end portions in the axial direction; a sleeve shaft 2 which is a shaft member inserted into a first end portion 11 of the tube 1; the stub shaft 3 connected to the sleeve shaft 2 to be moved in the axial direction; and a collar shaft 4 inserted into a second end portion 12 of the tube 1.

The tube 1 is made from carbon fiber reinforced plastic (CFRP). The tube 1 is formed into a cylindrical shape having a constant inside radius R1 in the axial direction. Moreover, in this tube 1, thicknesses T1 and T2 of the first end portion 11 and the second end portion 12 are greater than a thickness T3 of a general portion. More specifically, the tube 1 is formed by two or more layers including at least an inner circumference layer 13 and an outer circumference layer 14 which have different orientation angles of the carbon fiber. In the first end portion 11 and the second end portion 12, winding numbers of the inner circumference layers 13 are greater for press-fitting a sleeve shaft insertion portion 22 and a collar shaft insertion portion 44.

The sleeve shaft 2 includes a sleeve shaft main body portion 21 exposed from the first end portion 11 of the tube 1, and connected to the stub shaft 3; and the sleeve shaft insertion portion 22 which extends from a rear end portion of the sleeve shaft main body portion 21, and which is inserted into the first end portion 11 of the tube 1. The sleeve shaft main body portion 21 and the sleeve shaft insertion portion 22 are integrally made from a predetermined metal. The sleeve shaft main body portion 21 includes a sleeve shaft base portion 23 extending toward the front end side; and a sleeve shaft flange portion 24 which has a greater diameter to have a stepped shape from the rear end portion of the sleeve shaft base portion 23, and which is connected to the sleeve shaft insertion portion 22. The sleeve shaft insertion portion 22 is fixed to the tube 1 by a serration connection so as to rotate as a unit with the tube 1.

In this case, an outside diameter Dx of the sleeve shaft flange portion 24 is set to be greater than an inside diameter R1 of the inner circumference layer 13 of the first end portion 11 of the tube 1, and to be smaller than an inside diameter R2 of the outer circumference layer 14. That is, when the propeller shaft PS receives a compression load in the axial direction due to the collision of the vehicle, and so on, the sleeve shaft flange portion 24 pushingly expands the outer circumference layer 14 in the radially outward direction while peeling the inner circumference layer 13 of the first end portion 11 of the tube 1 so that the sleeve main body portion 12 can be inserted into the tube 1. By this collapse configuration in which the sleeve shaft main body portion 21 is inserted into the tube 1, it is possible to buffer the compression load, to absorb the collision energy of the vehicle, and to suppress the problem such as the bending of the propeller shaft PS toward the vehicle body side.

Moreover, the sleeve shaft 2 includes an internal spline portion 25 formed on the inner circumference side of the sleeve shaft 2 in the axial direction, and mounted onto an external spline portion 34 (described later) of the stub shaft 3 to be connected with the stub shaft 3.

The stub shaft 3 includes a first cylindrical base portion 31 having a cylindrical shape; a sleeve shaft side connection portion 32 provided on a rear end side of the first cylindrical base portion 3, and connected with the sleeve shaft 2 by the spline connection; and a first coupling side connection portion 33 provided on a front end side of the first cylindrical base portion 31, and connected to the first coupling member 5 by a first bolt B1. The first cylindrical base portion 31 and the sleeve shaft side connection portion 32 are integrally made from a predetermined metal. Moreover, the first cylindrical base portion 31 and the first coupling side connection portion 33 are joined by a known friction stir joining.

The first cylindrical base portion 31 includes a large diameter portion 311; a middle diameter portion 312; and a small diameter portion 313. The first cylindrical base portion 31 has a stepped (diameter) shape in which the diameter is decreased in a stepped shape from the front end side toward the rear end side. The large diameter portion 311 includes a front end portion connected to the first coupling side connection portion 311. The middle diameter portion 312 has the stepped shape in which the diameter is decreased with respect to the large diameter portion 311. The middle diameter portion 312 is provided between the large diameter portion 311 and the small diameter portion 313. The small diameter portion 313 has the stepped shape in which the diameter is decreased with respect to the middle diameter portion 312. The small diameter portion 313 includes a rear end portion connected to the sleeve shaft side connection portion 32.

The sleeve shaft side connection portion 32 includes an external spline portion 34 formed on an outer circumference side of the sleeve shaft side connection portion 32, and configured to be mounted in the internal spline portion 25 of the sleeve shaft 2. The external spline portion 34 is formed along the axial direction in an overall axial area of the sleeve shaft side connection portion 32. This external spline portion 34 is mounted in the internal spline portion 25 of the sleeve shaft 2, so that the sleeve shaft side connection portion 32 is configured to rotate as a unit with the sleeve shaft 2, and to be moved in the axial direction with respect to the sleeve shaft 2.

The first coupling side connection portion 33 includes a first annular base portion 35 which has an annular shape, and which is provided at a middle portion; and a plurality of (for example, three or four) first flange yokes 36 which extend from the first annular base portion 35 in radially outward directions, and which connected to the first coupling member 5 through a plurality of first bolts B1. The first annular base portion 35 and the first flange yoke 36 are integrally made from a predetermined metal.

The collar shaft 4 includes a collar shaft main body portion 41 having a cylindrical shape; and a second coupling side connection portion 42 provided on a rear end side of the collar shaft main body portion 41, and connected to the second coupling member 6 by a plurality of first bolts B1. The collar shaft main body portion 41 and the second coupling side connection portion 42 are joined by a known frictional stir joining.

The collar shaft main body portion 41 includes a second cylindrical base portion 43 exposed from the second end portion 12 of the tube 1, and connected to the second coupling side connection portion 42; and a collar shaft insertion portion 44 which extends from a front end portion of the second cylindrical base portion 43, and which is inserted into the second end portion 12 of the tube 1. The second cylindrical base portion 43 and the collar shaft insertion portion 44 are integrally made from a predetermined metal. The second cylindrical base portion 43 includes a collar shaft base portion 45 extending toward the rear end side; and a collar shaft flange portion 46 that has a stepped shape in which the diameter is increased from the front end portion of the collar shaft base portion 46, and that is connected to the collar shaft insertion portion 44. The collar shaft insertion portion 44 is fixed to the tube 1 by the serration connection to rotate as a unit with the tube 1

Similarly to the first coupling side connection portion 42, the second coupling side connection portion 42 includes a second annular base portion 47 which has an annular shape, and which is provided at a middle portion; and a plurality of (for example, three or four) second flange yokes 48 which extend from the second annular base portion 47 in radially outward directions, and which connected to the second coupling member 6 through the plurality of the first bolts B1. The second annular base portion 47 and the second flange yoke 48 are integrally made from a predetermined metal. The second cylindrical base portion 43 and the second coupling side connection portion 42 are joined by the known frictional stir coupling.

Similarly to the sleeve shaft flange portion 24, an outside diameter Dx of the collar shaft flange portion 46 is set to be greater than the inside diameter R1 of the inner circumference layer 13 of the second end portion 12 of the tube 1, and to be smaller than the inside diameter R2 of the outer circumference layer 14 of the tube 1. With this, the collar shaft flange portion 46 pushingly expands the outer circumference layer 14 in the radially outward direction while peeling the inner circumference layer 13 of the second end portion 12 of the tube 1 so that the second cylindrical base portion 43 and the collar shaft flange portion 46 can be inserted into the tube 1. With this, it is possible to absorb the collision energy of the vehicle, and to suppress In this case, an outside diameter Dx of the sleeve shaft flange portion 24 is set to be greater than an inside diameter R1 of the inner circumference layer 13 of the first end portion 11 of the tube 1, and to be smaller than an inside diameter R2 of the outer circumference layer 14. That is, when the propeller shaft PS receives a compression load in the axial direction due to the collision of the vehicle, and so on, the sleeve shaft flange portion 24 pushingly expands the outer circumference layer 14 in the radially outward direction while peeling the inner circumference layer 13 of the first end portion 11 of the tube 1 so that the sleeve main body portion 12 can be inserted into the tube 1. By this collapse configuration in which the sleeve shaft main body portion 21 is inserted into the tube 1, it is possible to buffer the compression load, to absorb the collision energy of the vehicle, and to suppress the problem such as the bending of the propeller shaft PS toward the vehicle body side.

The first coupling member 5 is a rubber joint formed into an annular shape. The first coupling member 5 includes first coupling first bolt through holes 51 disposed at a substantially regular interval in the circumferential direction for the connection with the first coupling side connection portion 33; and first coupling second bolt through holes 52 disposed between the first coupling first bolt through holes 51 at a substantially regular interval in the circumferential direction for the connection with the first shaft portion (not shown). That is, the first coupling side connection portion 33 and the first coupling member 5 are connected through the first bolts B1 penetrating through the first coupling first bolt through holes 51, and first nuts N1 tightened on the first bolts B1, so as to rotate as a unit with each other. On the other hand, the first shaft portion (not shown) and the first coupling member 5 are connected through the second bolts (not shown) penetrating through the first coupling second bolt through holes 52, and second nuts (not shown) tightened on the second bolts, so as to rotate as a unit with each other.

Similarly, the second coupling member 6 is a rubber joint formed into an annular shape. The second coupling member 6 includes second coupling first bolt through holes 61 disposed at a substantially regular interval in the circumferential direction for the connection with the second coupling side connection portion 42; and second coupling second bolt through holes 62 disposed between the second coupling first bolt through holes 61 at a substantially regular interval in the circumferential direction for the connection with the second shaft portion (not shown). That is, the second coupling side connection portion 42 and the second coupling member 6 are connected through the first bolts B1 penetrating through the second coupling first bolt through holes 61, and first nuts N1 tightened on the first bolts B1, so as to rotate as a unit with each other. On the other hand, the second shaft portion (not shown) and the second coupling member 6 are connected through the second bolts (not shown) penetrating through the second coupling second bolt through holes 62, and second nuts (not shown) tightened on the second bolts, so as to rotate as a unit with each other.

Moreover, as shown in FIG. 1 and FIG. 2, a boot member 7 is provided between the sleeve shaft 2 and the stub shaft 3. The boot member 7 has a bellows cylindrical shape to surround the connection portion between the sleeve shaft 2 and the stub shaft 3 (in particular, the external spline portion 34 exposed from the sleeve shaft 2) to extend between the sleeve shaft 2 and the stub shaft 3. The boot member is formed by blow-molding the resin, such as the polypropylene (PP) and the ethylene propylene diene rubber (EPDM). The boot member 7 includes a first mounting base portion 71 and a second mounting base portion 72 (described later) which are both end portions in the axial direction. The first mounting base portion 71 and the second mounting base portion 72 are tightened (bound) and fixed on the outer circumference surfaces of the sleeve shaft 2 and the stub shaft 3 by annular boot bands 8 made from the metal or the resin. That is, inner circumference surfaces of the first mounting base portion 71 and the second mounting base portion 72 are tightly abutted on the outer circumference surfaces of the sleeve shaft 2 and the stub shaft 3 by the tightening force (the binding force) of the boot band 8 to liquid-tightly protect the connection portion between the sleeve shaft 2 and the stub shaft 3. Moreover, a grease (not shown) is enclosed within the liquid-tightly protected inside of the boot member 7 to lubricate the connection portion between the sleeve shaft 2 and the stub shaft 3.

First Embodiment

Figure 3:
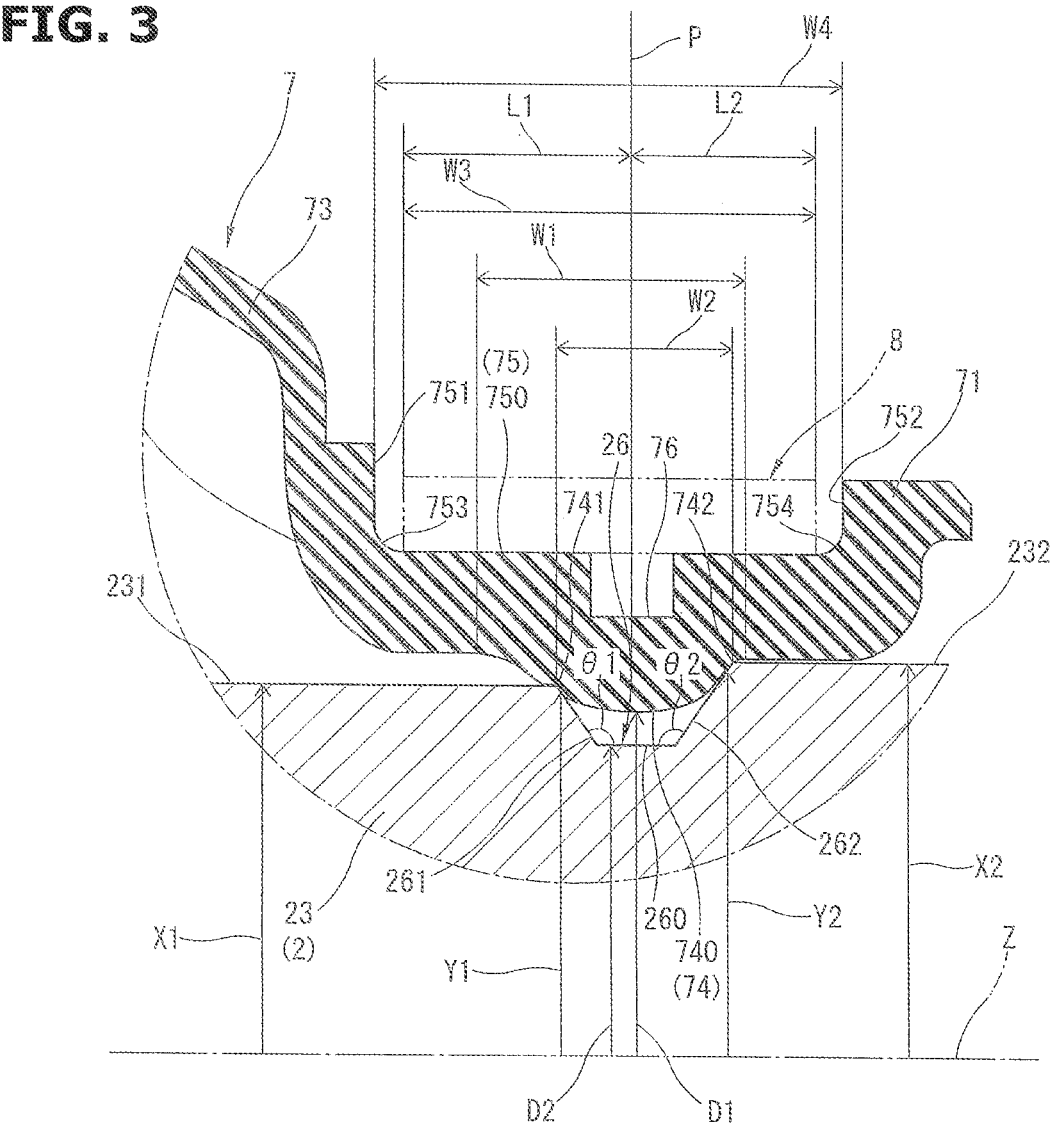
FIG. 3 is a partially sectional view showing a propeller shaft according to a first embodiment by enlarging A portion in FIG. 2.

FIG. 3 is a partially enlarged sectional view showing by enlarging an A portion of FIG. 2. Besides, in FIG. 3, the boot band 8 is represented by an imaginary line for convenience of the drawing. Moreover, the mounting configuration of the boot member 7 is identical in the sleeve shaft 2 and the stub shaft 3. Accordingly, in the following explanations, the only mounting configuration between the boot member 7 and the sleeve shaft 2 is explained. The explanations of the mounting configuration between the boot member 7 and the stub shaft 3 are omitted.

As shown in FIG. 3, the boot member 7 includes the first mounting base portion 71 provided at a rear end portion, and mounted to the sleeve shaft 2 through the boot band 8; the second mounting base portion 72 provided at a front end portion, and mounted to the stub shaft 3 through the boot band 8; and a bellows portion 73 provided between the first mounting base portion 71 and the second mounting base portion 72, and configured to extend and contract in the axial direction. In this case, the first mounting base portion 71 and the second mounting base portion 72 have the identical configuration. Accordingly, hereinafter, the only first mounting base portion 71 is explained about concrete configurations. The explanations of the configuration of the second mounting base portion 72 is omitted.

The first mounting base portion 71 has a substantially cylindrical shape. The first mounting base portion 71 includes a protruding portion 74 which protrudes toward the rotation axis Z in the radial direction, and which is configured to be mounted or received in a mounting groove 26 (described later) which is a groove portion; and a boot band tightening portion 75 which is provided on a side opposite to the protruding portion 74 in the radial direction, and which is for the tightening of the boot band 8. Moreover, the first mounting base portion 71 includes a recessed portion 76 which is provided on a bottom portion 750 of the boot band tightening portion 75, and which is recessed toward the rotation axis Z in the radial direction.

The protruding portion 74 has an arc section in the axial direction. The protruding portion 74 is a protrusion which is continuous in the overall circumference of the first mounting base portion 71 in the circumferential direction. The protruding portion 74 is configured to be mounted in the mounting groove 26 described later, and thereby to position the boot member 7 with respect to the stub shaft 2. In this case, in this embodiment, the protruding portion 74 is provided at a substantially middle position of the first mounting base portion 71 in the axial direction. That is, the protruding portion 74 has distances L1 and L2 from a center P of an arc surface 740 of the protruding portion 74 (center P of an axial width of the recessed portion 76 described later) to a first end portion 751 and a second end portion 752 that are both end portions of the boot band tightening portion 75. The protruding portion 74 is provided at a position at which the distances L1 and L2 are identical to each other in the axial region of the first mounting base portion 71.

Moreover, the protruding portion 74 has an axial width W1 which is slightly greater than an axial width W2 of an opening portion of the mounting groove 26 (described later) which is a counterpart of the protruding portion 74. Furthermore, the protruding portion 74 has an inside diameter D1 which is slightly smaller than an outside diameter X1 of a first outside diameter portion 231 (described later) of the sleeve shaft 2 (sleeve shaft base portion 23), and which is greater than an outside diameter D2 of the mounting groove 26 (described later). In this configuration, the first mounting base portion 71 is tightened by the boot band 8 as described later. With this, axial both end portions (first and second abutment portions 741 and 742) of an arc surface 740 of the protruding portion 74 are abutted on first and second connection portions 261 and 262 (described later) of the mounting groove 26, so that the protruding portion 74 performs sealing function. Moreover, in this embodiment, a radial length Y1 from the rotation axis Z to the first abutment portion 741 is shorter than a radial length Y2 from the rotation axis Z to the second abutment portion 742.

The boot band tightening portion 75 is recessed and formed on the outer circumference side of the first mounting base portion 71 toward the rotation axis Z in the radial direction. The boot band tightening portion 75 is an annular groove which is continuous in the overall circumference of the first mounting base portion 71 in the circumferential direction. Moreover, the boot band tightening portion 75 has an axial width W4 slightly greater than the axial width W3 of the boot band 8.

Furthermore, the recessed portion 76 is formed on the bottom portion 750 of the boot band tightening portion 75 on a side opposite to the protruding portion 74 in the radial direction. The recessed portion 76 is recessed in from the outside to the inside (toward the protruding portion 74) in the radial direction. This recessed portion 76 has a substantially rectangular section in the axial direction. The recessed portion 76 is continuously formed on the overall circumference of the boot band tightening portion 75 in the circumferential direction. A rigidity of a portion near the protruding portion 74 is decreased by providing this recessed portion 76, so that the tightening force (the binding force) of the boot band 8 is easy to be transmitted to the protruding portion 74. Accordingly, the first and second abutment portions 741 and 742 of the protruding portion 74 can be tightly abutted on the first and second connection portions 261 and 262 of the mounting groove 26 (described later).

On the other hand, the mounting groove 26 in which the protruding portion 74 is configured to be mounted is formed on the outer circumference of the sleeve shaft 2 (the sleeve shaft base portion 23) to which the boot member 7 is mounted. The mounting groove 26 is continuously formed on the overall circumference of the outer circumference of the sleeve shaft base portion 23 in the circumferential direction. This mounting groove 26 includes a groove bottom portion 260 which is parallel to the rotation axis Z; the first connection portion 261 which is provided on the front end side of the groove bottom portion 260, and which connects the groove bottom portion 260 and the first outside diameter portion 231 (described later); and the second connection portion 262 which is provided on the rear end side of the groove bottom portion 260, and which connects the groove bottom portion 260 and the second outside diameter portion 232 (described later). The mounting groove 26 has a substantially rectangular longitudinal section (a section in the axial direction). Moreover, the first connection portion 261 and the second connection portion 262 are inclined with respect to the groove bottom portion 260. That is, the first connection portion 261 and the second connection portion 262 are formed so that angles θ1 and θ2 formed by the first connection portion 261 and the second connection portion 262, and the groove bottom portion 260 are, respectively, obtuse angles. Besides, in this embodiment, the angle θ1 formed by the first connection portion 261 and the groove bottom portion 260 is substantially identical to the angle θ2 formed by the second connection portion 262 and the groove bottom portion 260.

Moreover, the sleeve shaft base portion 23 of the sleeve shaft 2 includes the first outside diameter portion 231 and the second outside diameter portion 232 positioned on the front side and the rear side of the mounting groove 26. That is, the first outside diameter portion 231 is formed on the front end side of the mounting groove 26. The second outside diameter portion 232 is formed on the rear end side of the mounting groove 26. The first outside diameter portion 231 and the second outside diameter portion 232 have different diameters. In particular, in the sleeve shaft base portion 23, an outside diameter X2 of the second outside diameter portion 232 is set to be greater than an outside diameter of the first outside diameter portion 231. In the insertion direction of the boot member 7 with respect to the sleeve shaft 2, the first outside diameter portion 231 is the front side, and the second outside diameter portion 232 is the back side. In this way, the sleeve shaft base portion 23 is formed so that the outside diameter X2 of the second outside diameter portion 232 on the back side is set to be greater than the outside diameter X1 of the first outside diameter portion 231 on the front side.

In this case, the outside diameter X1 of the first outside diameter portion 231 is set to be slightly greater than the inside diameter D1 of the protruding portion 74 of the boot member 7 to have a predetermined tightening margin (interference) with respect to the protruding portion 74. With this, when the boot member 7 is inserted onto the sleeve shaft 2, the protruding portion 74 is caught on the first connection portion 261 of the mounting groove 26. That is, in a state in which the boot member 7 is inserted onto the sleeve shaft 2 (the sleeve shaft base portion 23), the protruding portion 74 is caught on the mounting groove 26 by the tightening force (the binding force) of the boot member 7 itself, so as to position the boot member 7 with respect to the sleeve shaft 2 in the axial direction. With this, when the boot member 7 is tightened by the boot band 8, it is possible to suppress the position displacement of the boot member 7 with respect to the sleeve shaft 2 in the axial direction, and to readily perform the tightening operation of the boot member 7.

Moreover, the outside diameter X2 of the second outside diameter portion 232 is set to be greater than the outside diameter X1 of the first outside diameter portion 231, and to be sufficiently greater than the inside diameter D1 of the protruding portion 74 of the boot member 7. That is, the outside diameter X2 of the second outside diameter portion 232 is set so that the protruding portion 74 is caught on the second connection portion 262 of the mounting groove 26 so that the second outside diameter portion 232 is difficult to across move based on the second connection portion 262.

(Manufacturing Method of Propeller Shaft)

Hereinafter, a manufacturing method of the propeller shaft PS according to the embodiment is explained with reference to FIG. 4. Besides, in the following explanations, in the manufacturing method of the propeller shaft PS, a process for the connection of the stub shaft 3 with respect to the sleeve shaft 2, that is, a process for the mounting of the boot member 7 relating to the technical problems in the present invention is explained.

Figure 4:
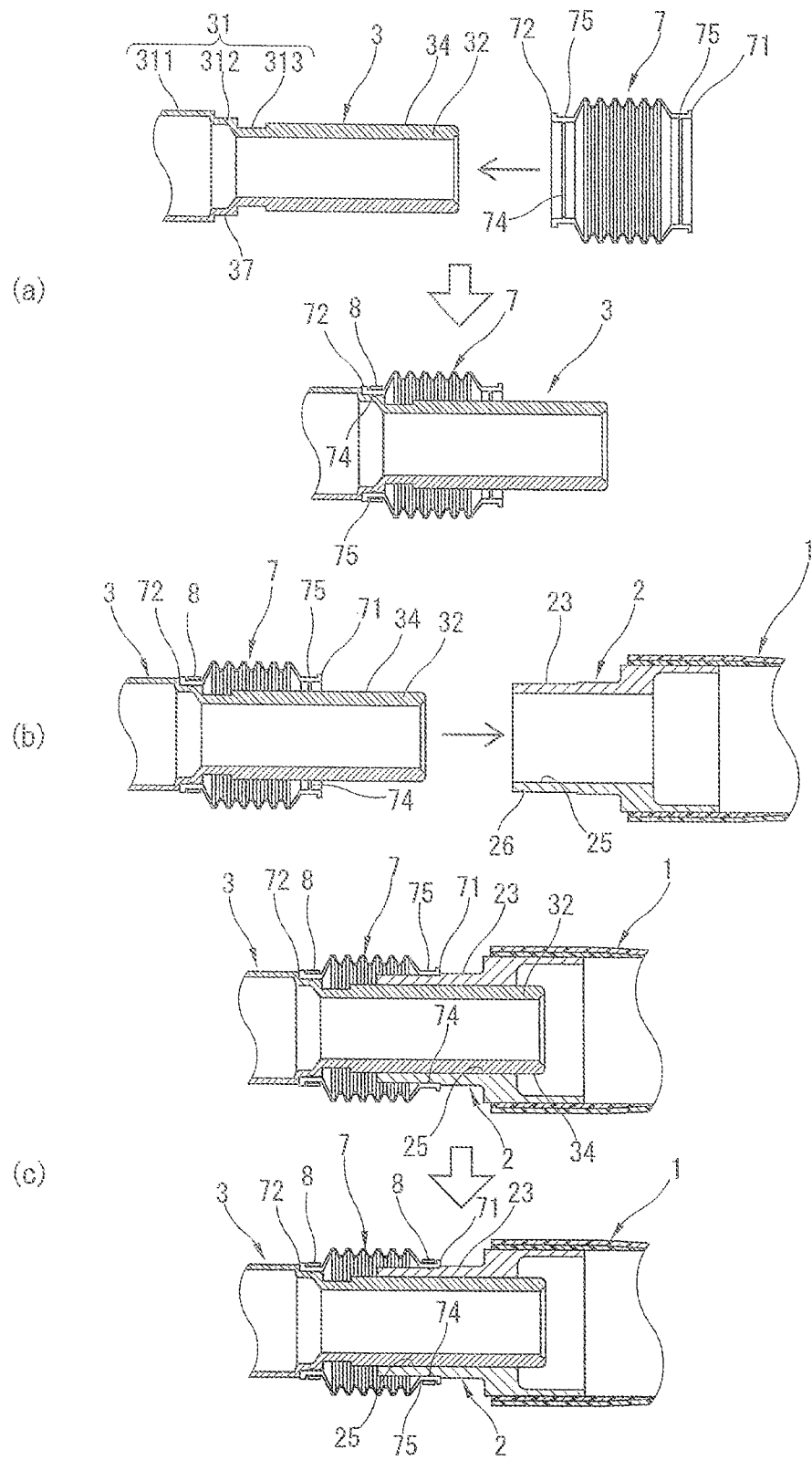
FIG. 4 are views showing a manufacturing method of the propeller shaft.

FIG. 4 are longitudinal sectional views showing main parts of the propeller shaft PS, and representing the manufacturing method of the propeller shaft PS. FIG. 4(*a*) shows a first process. FIG. 4(*b*) shows a second process. FIG. 4(*c*) shows a third process.

Firstly, in the first process, as shown in FIG. 4A, the second mounting base portion 72 of the boot member 7 is mounted on the outer circumference of the stub shaft 3 (the middle diameter portion 312 of the stub shaft 3. That is, the boot member 7 is inserted from the rear end side of the sleeve shaft side connection portion 32 of the stub shaft 3. The protruding portion 74 provided on the inner circumference side of the second mounting base portion 72 of the boot member 7 is mounted in the mounting groove 37 provided on the outer circumference side of the middle diameter portion 312 of the first cylindrical base portion 31. Then, the boot band 8 is tightened on the boot band tightening portion 75 provided on the outer circumference side of the second mounting base portion 72 of the boot member 7 to fix the second mounting base portion 72 of the boot member 7 on the stub shaft 3.

Next, in the second process, as shown in FIG. 4(*b*), the sleeve shaft side connection portion 32 of the stub shaft 3 to which the second mounting base portion 72 of the boot member 7 is mounted is inserted into the inner circumference portion of the sleeve shaft 2. That is, the sleeve shaft side connection portion 32 of the stub shaft 3 is inserted into the inner circumference side of the sleeve shaft 2 while the external spline portion 34 of the sleeve shaft side connection portion 32 of the stub shaft 3 is mounted in the internal spline portion 25 of the sleeve shaft 2.

Next, in the third process, as shown in FIG. 4(*c*), the first mounting base portion 71 of the boot member 7 is inserted from the tip end side of the sleeve shaft base portion 23 of the sleeve shaft 2 in accordance with the insertion of the sleeve shaft side connection portion 32 of the stub shaft 3. The protruding portion 74 provided to the first mounting portion 71 of the boot member 7 is mounted in the mounting groove 26 of the sleeve shaft 2. Then, the boot band 8 is tightened on the boot band tightening portion 75 of the first mounting base portion 71 of the boot member 7 to fix the first mounting base portion 71 of the boot member 7 on the sleeve shaft 2.

(Operations and Effects in this Embodiment)

As described above, in the conventional propeller shaft, the outside diameters of the first and second shaft portions are set to the identical diameter on the front side and the rear side of the mounting groove in the insertion direction of the boot member. Accordingly, when the boot member is inserted onto the first and second shaft portions, the inside diameter of the boot member needs to expand by the extra protruding amount of the protruding portion, so that the assembling workability is deteriorated.

On the other hand, it is conceivable that the outside diameters on the front and rear sides of the mounting groove are set to the small diameters for decreasing the insertion load of the boot member. However, in this case, when the boot member is inserted, for example, the protruding portion gets over the mounting groove, so that the protruding portion is difficult to be mounted in the mounting groove. In the different view point of the case in which the first and second shaft portions are set to be appropriate outside diameters, the assembling workability is deteriorated.

On the other hand, in the propeller shaft PS according to the embodiment, it is possible to attain the following effects, and thereby to solve the problems of the conventional propeller shaft.

The propeller shaft 49 configured to transmit a rotation force from a power source of a vehicle to a wheel of the vehicle, the propeller shaft includes:

the cylindrical boot member 7 including a protruding portion 74 protruding in the radially inward direction with respect to the rotation axis Z direction of the boot member 7, and the boot band tightening portion 75 provided on a side opposite to the protruding portion 74 in the radial direction, and recessed toward the rotation axis;

the shaft member (the sleeve shaft 2) which is inserted into the boot member 7, and which includes the first outside diameter portion 231, the groove portion (the mounting groove 26), and the second outside diameter portion 232 which are disposed in this order from a tip end portion of the shaft member (the sleeve shaft 2) in the rotation axis direction, the first diameter portion 231 having an outside diameter X1 greater than an inside diameter D1 of the protruding portion 74, the groove portion (the mounting groove 26) which has an outside diameter D2 smaller than the outside diameter of the first outside diameter portion 231, and in which the protruding portion 74 is received, and the second outside diameter portion 232 having an outside diameter X2 greater than the outside diameter of the first outside diameter portion 231; and a boot band 8 tightened on the boot band tightening portion 75.

In the conventional device, the outside diameter X1 of the first outside diameter portion 231 is set to be identical to the outside diameter X2 of the second outside diameter portion 232. In this embodiment, the outside diameter X1 of the first outside diameter portion 231 is set to be relatively smaller than the outside diameter X2 of the second outside diameter portion 232. With this, when the boot member 7 is inserted onto the shaft member (the sleeve shaft 2), it is possible to decrease the diameter increasing amount of the protruding portion 74 by the difference amount between the outside diameter X1 of the first outside diameter portion 22 and the outside diameter X2 of the second outside diameter portion 232. Accordingly, it is possible to mount the protruding portion 74 in the mounting groove 26 by the diameter increasing amount smaller than the diameter increasing amount of the conventional device, and to improve the insertion workability of the boot member 7 with respect to the shaft member (the sleeve shaft 2).

Moreover, the outside diameter X1 of the first outside diameter portion 231 is set to be greater than the inside diameter D1 of the protruding portion 74. Furthermore, the outside diameter X2 of the second outside diameter portion 232 is set to be greater than the outside diameter X1 of the first outside diameter portion 231. Accordingly, when the boot member 7 is inserted onto the shaft member (the sleeve shaft 2), it is possible to surely mount the protruding portion 74 in the mounting groove 26. With this, it is possible to surely restrict the movement in the axial direction, and to suppress the problem that the protruding portion 74 gets on the second outside diameter portion 232 over the mounting groove 26. In this view point, it is possible to improve the insertion workability of the boot member 7 with respect to the shaft member (the sleeve shaft 2).

Moreover, in this embodiment, the shaft member (the sleeve shaft 2) includes the first connection portion 261 connected with the groove bottom portion 260 of the groove portion (the mounting groove 26) and the first outside diameter portion 231, and a second connection portion 262 connected with the groove bottom portion 260 of the groove portion (the mounting groove 26) and the second outside diameter portion 232; a length from the rotation axis Z to the first connection portion 261 in the radial direction is gently shorter from the first outside diameter portion 231 toward the groove bottom portion 260 of the groove portion (the mounting groove 26) in the rotation axis Z direction; a length from the rotation axis Z to the second connection portion 262 in the radial direction is gently longer from the groove bottom portion 260 of the groove portion (the mounting groove 26) toward the second outside diameter portion 232 in the rotation axis Z direction;

the boot member 7 includes a first abutment portion 741 abutted on the first connection portion 261 and a second abutment portion 742 abutted on the second connection portion 262; and a length from the rotation axis Z to the first abutment portion 741 is shorter than a length from the rotation axis Z to the second abutment portion 742.

In this way, in this embodiment, the first and second abutment portions 741 and 742 are abutted, respectively, on the first and second connection portions 261 and 262 of the groove portion (the mounting groove 26). That is, the protruding portion 74 of the boot member 7 is abutted on the groove portion (the mounting groove 26) at two portions of the first and second abutment portions 741 and 742. With this, it is possible to improve the sealing ability by the protruding portion 74 within the groove portion (the mounting groove 26), and thereby to effectively suppress the leakage of the grease (not shown) from the inside, and the entering of the muddy water and so on from the outside.

Moreover, in this embodiment, the second outside diameter portion 232 of the sleeve shaft 2 has a diameter greater than the inside diameter D1 of the protruding portion 74 of the boot member (the first mounting base portion 71).

In this way, in this embodiment, In this way, in this embodiment, the second outside diameter portion 232 of the sleeve shaft 2 has the outside diameter X2 which is greater than the inside diameter D1 of the protruding portion 74 of the first mounting base portion 71 of the boot member 7. With this, the protruding portion 74 is easy to be mounted in the mounting groove 26. It is possible to improve the seat ability (seat characteristic) of the protruding portion 74 with respect to the mounting groove 26. That is, the protruding portion 74 is easy to be caught on the second connection portion 262 of the mounting groove 26. It is possible to improve the tight abutment between the protruding portion 74 and the mounting groove 26 (in particular, the second connection portion 262). Accordingly, it is possible to improve the sealing ability between the protruding portion 74 and the mounting groove 26, and efficiently suppress the entering of the water from the first mounting base portion 71 side of the boot member 7.

A manufacturing method of a propeller shaft including a rod member (the stub shaft 3), a cylindrical boot member 7 which is mounted to the rod member (the stub shaft 3), and which includes a protruding portion 74 protruding in a radial direction with respect to a rotation axis Z of the boot member 7 toward the rotation axis Z, and a boot band tightening portion 75 provided on a side opposite to the protruding portion 74 in the radial direction, and recessed toward the rotation axis, and a cylindrical shaft member (the sleeve shaft 2) into which a tip end portion of the rod member (the stub shaft 3) is inserted, and which includes a portion covered by the boot member 7, which includes a first outside diameter portion 231, a mounting groove 26, and a second outside diameter portion 232 which are disposed in this order from a tip end portion of the shaft member (the sleeve shaft 2) in the rotation axis direction, the first diameter portion 231 having an outside diameter greater than an inside diameter of the protruding portion 74, the mounting groove 26 which has an outside diameter smaller than the outside diameter of the first outside diameter portion 231, and in which the protruding portion 74 is received, and the second outside diameter portion 232 having an outside diameter greater than the outside diameter of the first outside diameter portion 231, the manufacturing method includes;

a first process of mounting the boot member 7 to the rod member (the stub shaft 3);

a second process of inserting the rod member (the stub shaft 3) into an inner circumference surface of the shaft member (the sleeve shaft 2); and a third process mounting the protruding portion 74 in the mounting groove 26.

In the conventional device, the outside diameter X1 of the first outside diameter portion 231 is set to be identical to the outside diameter X2 of the second outside diameter portion 232. In this embodiment, the outside diameter X1 of the first outside diameter portion 231 is set to be relatively smaller than the outside diameter X2 of the second outside diameter portion 232. With this, when the boot member 7 is inserted onto the shaft member (the sleeve shaft 2), it is possible to decrease the diameter increasing amount of the protruding portion 74 by the difference amount between the outside diameter X1 of the first outside diameter portion 22 and the outside diameter X2 of the second outside diameter portion 232. Accordingly, it is possible to mount the protruding portion 74 in the mounting groove 26 by the diameter increasing amount smaller than the diameter increasing amount of the conventional device, and to improve the insertion workability of the boot member 7 with respect to the shaft member (the sleeve shaft 2).

Moreover, the outside diameter X1 of the first outside diameter portion 231 is set to be greater than the inside diameter D1 of the protruding portion 74. Furthermore, the outside diameter X2 of the second outside diameter portion 232 is set to be greater than the outside diameter X1 of the first outside diameter portion 231. Accordingly, when the boot member 7 is inserted onto the shaft member (the sleeve shaft 2), it is possible to surely mount the protruding portion 74 in the mounting groove 26. With this, it is possible to surely restrict the movement in the axial direction, and to suppress the problem that the protruding portion 74 gets on the second outside diameter portion 232 over the mounting groove 26. In this view point, it is possible to improve the insertion workability of the boot member 7 with respect to the shaft member (the sleeve shaft 2).

Moreover, in the manufacturing method of the propeller shaft according to the embodiment, the boot member 7 is formed by the blow molding.

In this way, in this embodiment, the boot member 7 is formed by blow molding the resin. Accordingly, the die for molding the boot member 7 is needed only for the outer circumference side of the boot member 7. Consequently, it is possible to relatively readily mold the boot member 7. Therefore, it is possible to decrease the manufacturing cost of the propeller shaft PS, and to improve the productivity.

Moreover, in the manufacturing method of the propeller shaft according to the embodiment, the mounting groove 37 in which the protruding portion 74 is mounted is formed on an outer circumference surface of the rod member (the sleeve shaft side connection portion 32 of the stub shaft 3).

In this way, in this embodiment, the mounting groove 37 in which the protruding portion 74 provided on the inner circumference side of the second mounting base portion 72 of the boot member 7 is mounted is provided on the outer circumference surface of the rod member (the sleeve shaft side connection portion 32 of the stub shaft 3). With this, in the second mounting base portion 72 of the boot member 7, it is also possible to improve the insertion workability of the boot member 7 with respect to the rod member (the sleeve shaft side connection portion 32 of the stub shaft 3), similarly to the first mounting base portion 71.

Second Embodiment

Figure 5:
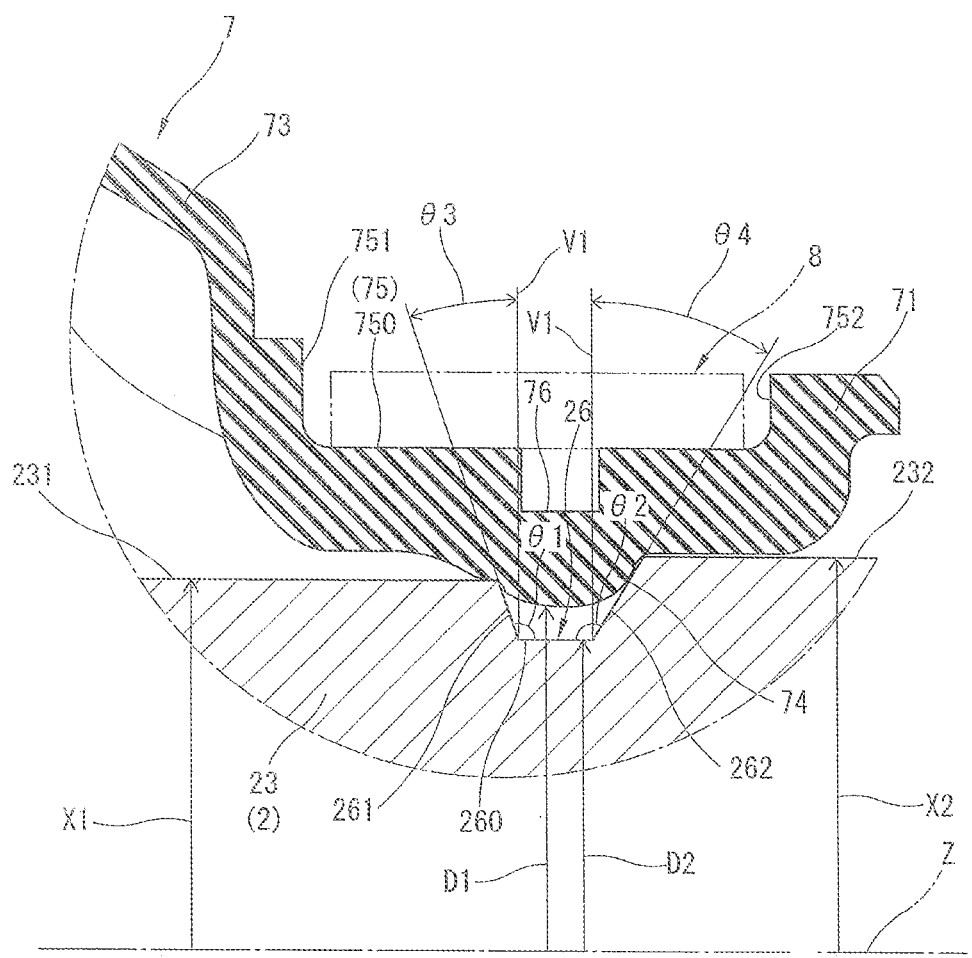
FIG. 5 is a partially sectional view showing a propeller shaft according to a second embodiment by enlarging the A portion in FIG. 2.

FIG. 5 shows a propeller shaft according to a second embodiment of the present invention. In this embodiment, the configuration of the mounting groove 26 of the sleeve shaft 2 of the propeller shaft PS according to the first embodiment is varied. The basic configuration other than the above-described variation is identical to that of the first embodiment. Accordingly, the configurations identical to those of the first embodiment has the same symbols. Those explanations are omitted. Moreover, for the explanations in this embodiment, a left side in FIG. 5 is represented as "front", and a right side in FIG. 5 is represented as "rear". A direction along a rotation axis Z in FIG. 5 is represented as "axial direction". A direction perpendicular to the rotation axis Z is represented as "radial direction". A direction around the rotation axis Z is represented as "circumferential direction".

FIG. 5 is an enlarged view showing a main portion of the propeller shaft PS according to the second embodiment of the present invention by enlarging the A portion of FIG. 2, similarly to FIG. 3.

As shown in FIG. 5, a first imaginary line V1 is defined by a line perpendicular to the rotation axis Z of the boot member 7. In this embodiment, an angle θ3 formed by the first imaginary line V1 and the first connection portion 261 is set to be smaller than an angle θ4 formed by the first imaginary line V1 and the second connection portion 262 of the mounting groove 26. That is, in this embodiment, an inclination angle θ1 of the first connection portion 261 with respect to the groove bottom portion 260 of the mounting groove 26 is set to be greater than an inclination angle θ2 of the second connection portion 262 of the second connection portion 262 with respect to the groove bottom portion 260 of the mounting groove 26.

As described above, in this embodiment, the angle θ3 formed by the groove bottom portion 260 of the groove portion (the mounting groove 26) and the first connection portion 261 is smaller than the angle θ4 formed by the groove bottom portion 260 of the groove portion (the mounting groove 26) and the second connection portion 262 when viewed from a section perpendicular to the rotation axis Z of the boot member 7. With this, the engagement amount (the biting amount) of the boot member 7 on the first connection portion 261 side with respect to the groove portion (the mounting groove 26) can be greater than the engagement amount (the biting amount) of the boot member 7 on the second connection portion 262 with respect to the groove portion (the mounting groove 26). That is, the engagement amount of the protruding portion 74 of the boot member 7 with respect to the first connection portion 261 of the groove portion (the mounting groove 26) can be greater than the engagement amount of the protruding portion 74 of the boot member 7 with respect to the second connection portion 262 of the groove portion (the mounting groove 26). Accordingly, it is possible to relatively increase the sealing ability between the protruding portion 74 and the first connection portion 261 of the groove portion (the mounting groove 26) relative to the sealing ability between the protruding portion 74 and the second connection portion 262 of the groove portion (the mounting groove 26). That is, even when the water enters from between the protruding portion 74 and the second connection portion 262 into the groove portion (the mounting groove 26), it is possible to suppress the entering of the water within the groove portion (the mounting groove 26) into the first outside diameter portion 231 side by the relatively increased sealing ability between the protruding portion 74 and the first connection portion 261.

Third Embodiment

Figure 6:
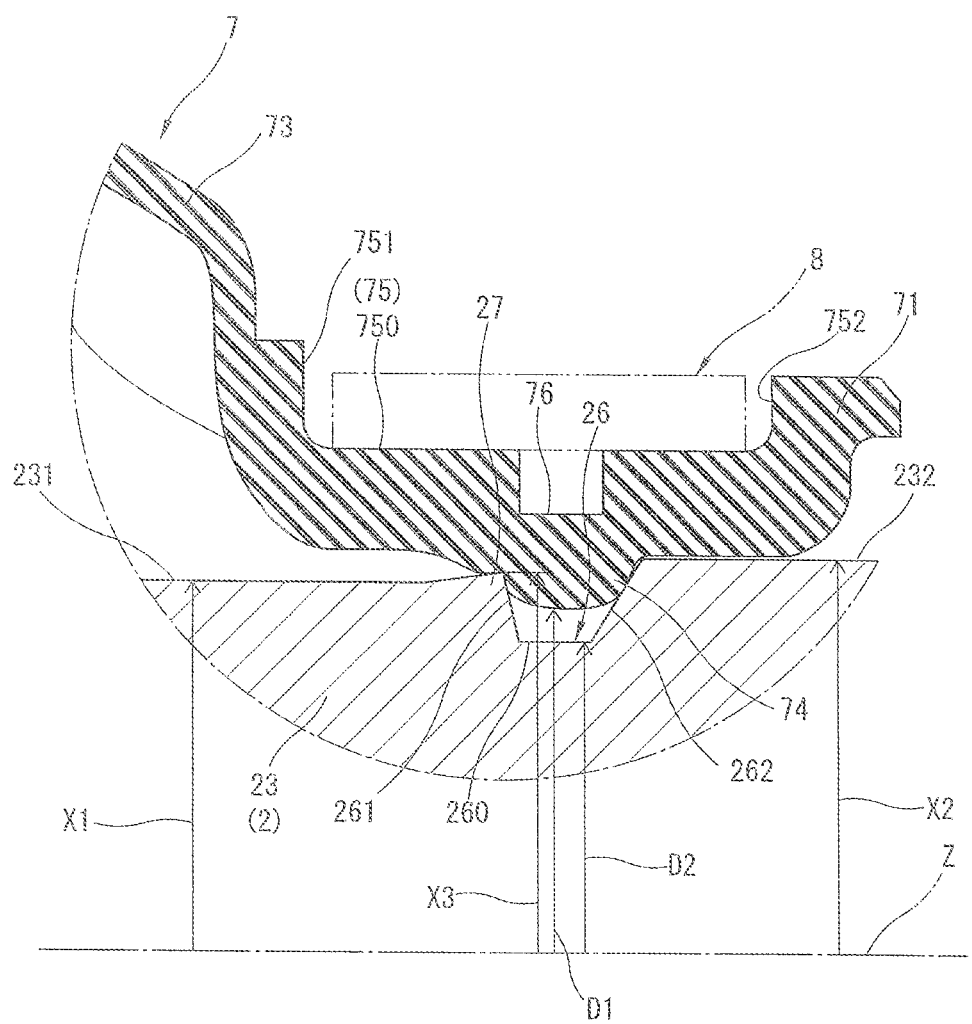
FIG. 6 is a partially sectional view showing a propeller shaft according to a third embodiment by enlarging the A portion in FIG. 2.

FIG. 6 shows a propeller shaft according to a third embodiment of the present invention. In this embodiment, the configuration of the mounting groove 26 of the sleeve shaft 2 of the propeller shaft PS according to the first embodiment is varied. The basic configuration other than the above-described variation is identical to that of the first embodiment. Accordingly, the configurations identical to those of the first embodiment has the same symbols. Those explanations are omitted. Moreover, for the explanations in this embodiment, a left side in FIG. 6 is represented as "front", and a right side in FIG. 6 is represented as "rear". A direction along a rotation axis Z in FIG. 6 is represented as "axial direction". A direction perpendicular to the rotation axis Z is represented as "radial direction". A direction around the rotation axis Z is represented as "circumferential direction".

FIG. 6 is an enlarged view showing a main portion of the propeller shaft PS according to the third embodiment of the present invention by enlarging the A portion of FIG. 2, similarly to FIG. 3.

In this embodiment, as shown in FIG. 6, a raised portion 27 is provided between the first outside diameter portion 231 and the mounting groove 26 of the sleeve shaft 2 in the axial direction, that is, at the opening edge of the mounting groove 26 on the first outside diameter portion 231 side. The raised portion 27 protrudes in the radially outward direction (on the side opposite to the protruding portion 74). This raised portion 27 has a diameter which is greater than the outside diameter X1 of the first outside diameter portion 231, and which is smaller than the outside diameter X2 of the second outside diameter portion 232.

As described above, in this embodiment, the shaft member (the sleeve shaft 2) includes the raised portion 27 which is formed between the first outside diameter portion 231 and the groove portion (the mounting groove 26) in the rotation axis Z direction, and which has the diameter that is greater than the outside diameter X1 of the first outside diameter portion 231, and that is smaller than the outside diameter X2 of the second outside diameter portion 232. By providing this raised portion 27, the protruding portion 74 is more tightly abutted on the opening edge of the groove portion (the mounting groove 26). With this, it is possible to improve the tight abutment between the protruding portion 74 and the first connection portion 261 of the groove portion (the mounting groove 26), and to improve the sealing ability between the protruding portion 74 and the first connection portion 261 of the groove portion (the mounting groove 26). Consequently, it is more effectively suppress the water entered from the first mounting base portion 71 side of the boot member 7 into the groove portion (the mounting groove 26), from entering the first outside diameter portion 231 side.

Fourth Embodiment

Figure 7:
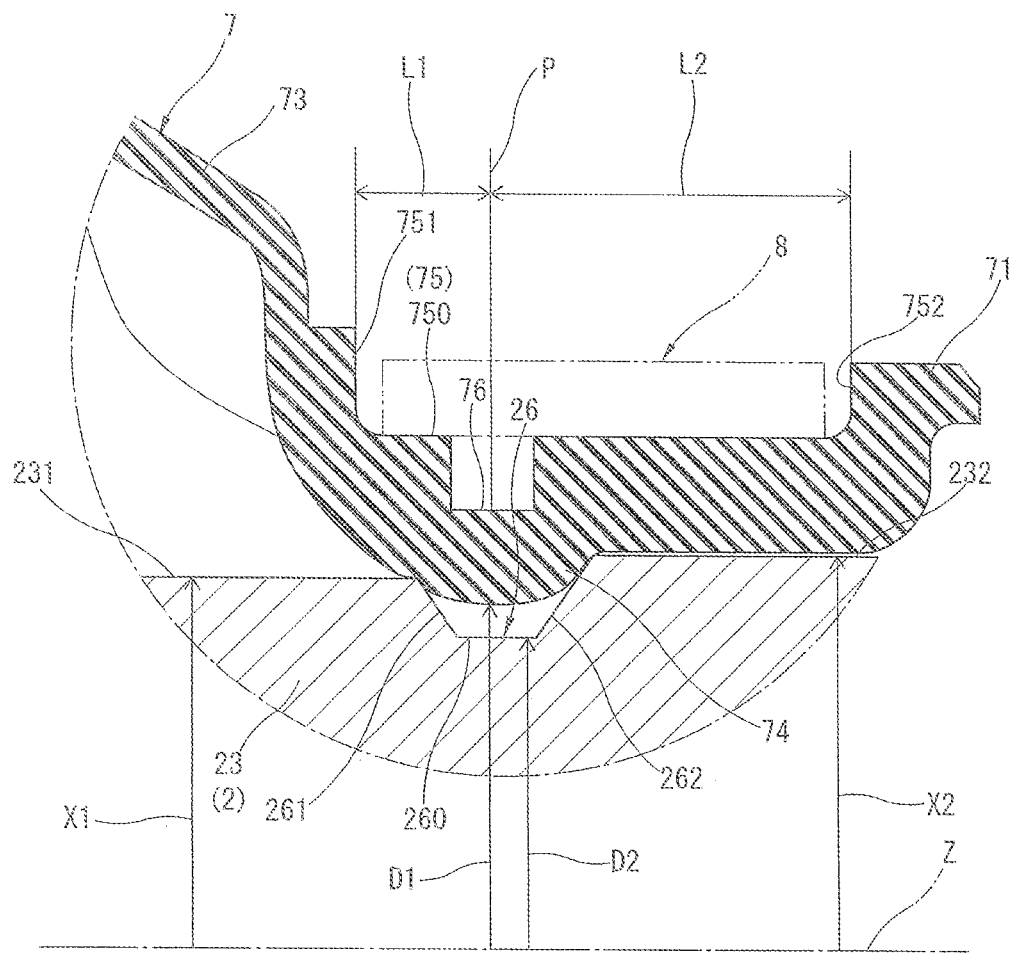
FIG. 7 is a partially sectional view showing a propeller shaft according to a fourth embodiment by enlarging the A portion in FIG. 2.

FIG. 7 shows a propeller shaft according to a fourth embodiment of the present invention. In this embodiment, the disposition of the recessed portion 76 in the boot band tightening portion 75 of the propeller shaft PS according to the first embodiment is varied. The basic configuration other than the above-described variation is identical to that of the first embodiment. Accordingly, the configurations identical to those of the first embodiment has the same symbols. Those explanations are omitted. Moreover, for the explanations inn this embodiment, a left side in FIG. 7 is represented as "front", and a right side in FIG. 7 is represented as "rear". A direction along a rotation axis Z in FIG. 7 is represented as "axial direction". A direction perpendicular to the rotation axis Z is represented as "radial direction". A direction around the rotation axis Z is represented as "circumferential direction".

FIG. 7 is an enlarged view showing a main portion of the propeller shaft PS according to the fourth embodiment of the present invention by enlarging the A portion of FIG. 2, similarly to FIG. 3.

In this embodiment, as shown in FIG. 7, the protruding portion 74 is eccentrically disposed on the bellows portion 73 side (the side opposite to the opening portion of the first mounting base portion 71) in the axial direction. That is, the protruding portion 74 is provided in the axial range of the first mounting base portion 71 so that the distance L2 from the center P of the arc surface 740 of the protruding portion 74 (the center P of the axial width of the recessed portion 76) to the second end portion 752 of the boot band tightening portion 75 is greater than the distance L1 from the center P to the first end portion 751 of the boot band tightening portion 75.

As described above, in this embodiment, the boot band tightening portion 75 includes the first end portion 751 provided on the first outside diameter portion 231 side in the rotation axis Z direction, the second end portion 752 provided on the second outside diameter portion 232 side in the rotation axis Z direction, and the recessed portion 76 recessed in the radially inward direction. The second width portion which is a width from the recessed portion 76 to the second end portion 752 (the distance L2 from the center P to the second end portion 752 of the boot band tightening portion 75) is longer than the first width portion which is a width from the recessed portion 76 to the first end portion 751 (the distance L1 from the center P to the first end portion 751 of the boot band tightening portion 75), in the rotation axis Z direction.

In this way, in this embodiment, the protruding portion 74 is eccentrically provided on the bellows portion 73 side. The distance L2 from the recessed portion 76 to the second end portion 752 of the boot band tightening portion 75 is set to be longer than the distance L1 from the recessed portion 76 to the first end portion 751 of the boot band tightening portion 75. With this, the abutment area of the boot member 7 (the first mounting base portion 71) with the second outside diameter portion 232. It is possible to improve the tight abutment between the first mounting base portion 71 and the second outside diameter portion 232. Accordingly, it is possible to more effectively suppress the water from entering from the opening portion of the first mounting base portion 71 of the boot member 7.

Fifth Embodiment

Figure 8:
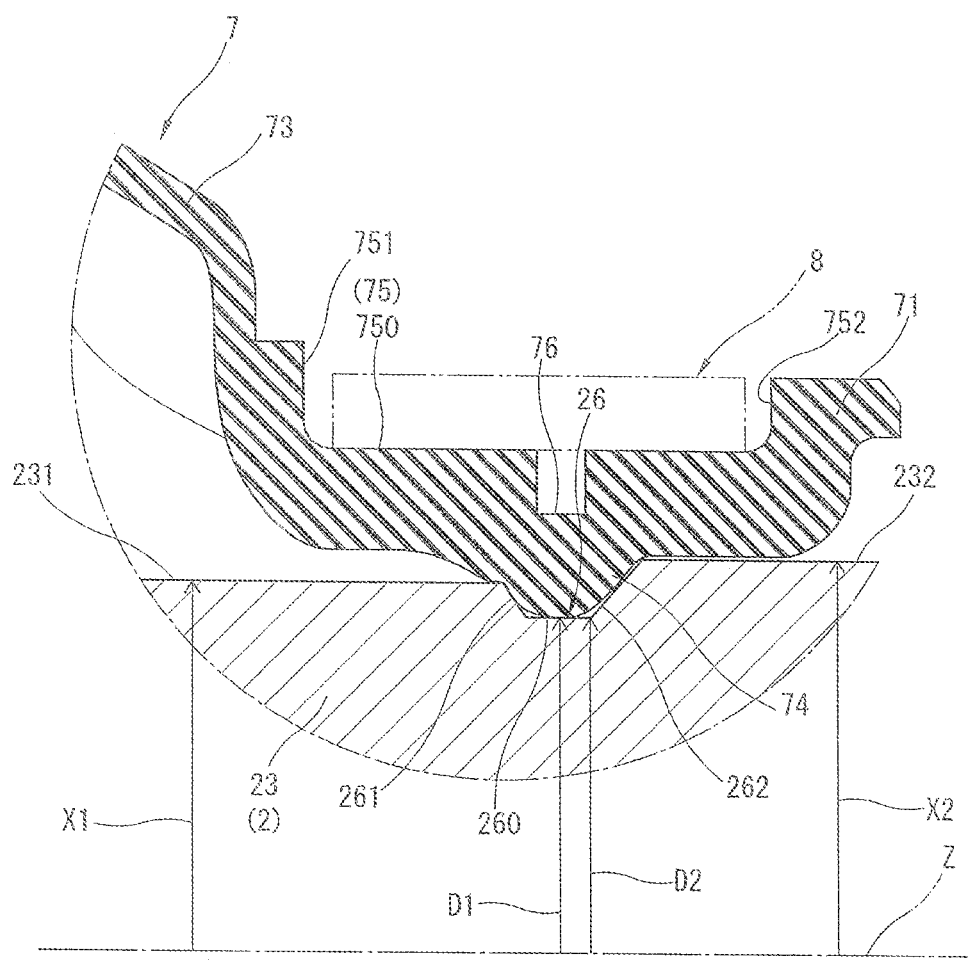
FIG. 8 is a partially sectional view showing a propeller shaft according to a fifth embodiment by enlarging the A portion in FIG. 2.

FIG. 8 shows a propeller shaft according to a fifth embodiment of the present invention. In this embodiment, the configuration of the protruding portion 74 of the boot member 7 of the propeller shaft PS according to the first embodiment is varied. The basic configuration other than the above-described variation is identical to that of the first embodiment. Accordingly, the configurations identical to those of the first embodiment has the same symbols. Those explanations are omitted. Moreover, for the explanations inn this embodiment, a left side in FIG. 8 is represented as "front", and a right side in FIG. 8 is represented as "rear". A direction along a rotation axis Z in FIG. 8 is represented as "axial direction". A direction perpendicular to the rotation axis Z is represented as "radial direction". A direction around the rotation axis Z is represented as "circumferential direction".

FIG. 8 is an enlarged view showing a main portion of the propeller shaft PS according to the fifth embodiment of the present invention by enlarging the A portion of FIG. 2, similarly to FIG. 3.

In this embodiment, as shown in FIG. 8, the outer surface of the protruding portion 74 corresponding to the inner circumference surface of the protruding portion of the boot member 7 is formed into a shape corresponding to the inner surface of the mounting groove 26 corresponding to the outer circumference surface of the mounting groove 26 of the sleeve shaft 2, that is, a similar shape (analogous shape) which can be tightly abutted on the mounting groove 26.

As described above, in this embodiment, the inner circumference surface of the protruding portion 74 has the shape corresponding to the outer circumference surface of the groove portion (the mounting groove 26). With this, the substantially entire outer surface of the protruding portion 74 corresponding to the inner circumference surface of the protruding portion 74 can be tightly abutted on the outer circumference surface of the groove portion (the mounting groove 26) corresponding to the inner surface of the groove portion (the mounting groove 26). Accordingly, it is possible to readily and surely improve the sealing ability between the protruding portion 74 and the groove portion (the mounting groove 26).

Moreover, the outer surface of the protruding portion 74 corresponding to the inner circumference surface of the protruding portion 74 corresponds to the inner surface of the groove portion (the mounting groove 26) corresponding to the outer circumference surface of the groove portion (the mounting groove 26). With this, it is possible to suppress the protruding portion 74 from being abutted on the angular portion formed near the groove portion (the mounting groove 26), such as the opening edge of the groove portion (the mounting groove 26). Consequently, it is possible to improve the durability (the lifetime) of the boot member 7, and to maintain the good sealing ability of the protruding portion 74 during the long time.

Sixth Embodiment

Figure 9:
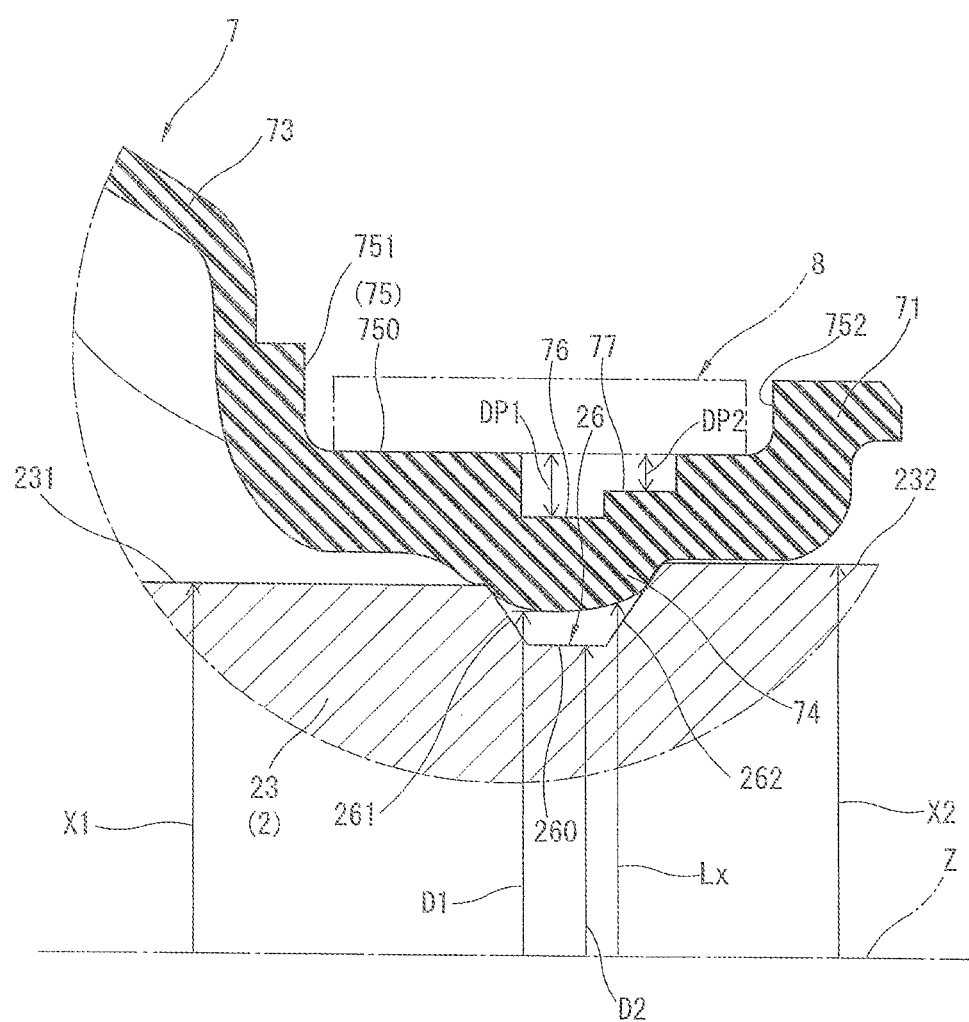
FIG. 9 is a partially sectional view showing a propeller shaft according to a sixth embodiment by enlarging the A portion in FIG. 2.

FIG. 9 shows a propeller shaft according to a sixth embodiment of the present invention. In this embodiment, the configuration of the protruding portion 74 of the boot member 7 of the propeller shaft PS according to the first embodiment is varied. The basic configuration other than the above-described variation is identical to that of the first embodiment. Accordingly, the configurations identical to those of the first embodiment has the same symbols. Those explanations are omitted. Moreover, for the explanations inn this embodiment, a left side in FIG. 9 is represented as "front", and a right side in FIG. 9 is represented as "rear". A direction along a rotation axis Z in FIG. 9 is represented as "axial direction". A direction perpendicular to the rotation axis Z is represented as "radial direction". A direction around the rotation axis Z is represented as "circumferential direction".

FIG. 9 is an enlarged view showing a main portion of the propeller shaft PS according to the sixth embodiment of the present invention by enlarging the A portion of FIG. 2, similarly to FIG. 3.

In this embodiment, as shown in FIG. 9, the bottom portion 750 of the boot band tightening portion 75 includes the recessed portion 76 having a stepped shape toward the second end portion 752 side. That is, the bottom portion 750 of the boot band tightening portion 75 includes the first recessed portion 76 which is provided at a central position in the axial direction, and which corresponds to the recessed portion 76 in the first embodiment; and the second recessed portion 77 which is provided adjacent to the first recessed portion 76 on the second end portion 752 side, and which has a depth DP2 smaller than a depth DP1 of the first recessed portion 76. By providing these first and second recessed portions 76 and 77, the rear end side of the protruding portion 74 (the opening portion side of the first mounting base portion 71) has a relatively gentle inclination shape relative to the front end side (the bellows portion 73 side). That is, the increasing rate of the distance Lx from the outer surface of the protruding portion 74 to the rotation axis Z on the rear end side (the first mounting base portion 71 side) of the protruding portion 74 is set to be smaller than the increasing rate of the distance Lx from the outer surface of the protruding portion 74 to the rotation axis Z on the front end side (the bellows portion 73 side) of the protruding portion 74.

As described above, in this embodiment, the boot band tightening portion 75 includes the first recessed portion 76 recessed in the radially inward direction; and the second recessed portion 77 which is connected to the first recessed portion 76, and which is recessed in the radially inward direction to have a depth smaller than a depth of the first recessed portion 76. In this way, the stepped recessed portion having the first and second recessed portion 76 and 77 is provided. With this, it is possible to form the inclination of the protruding portion 74 positioned on the insertion side of the boot member 7, to the gentler shape. Accordingly, it is possible to decrease the insertion resistance of the protruding portion 74 when the boot member 7 is inserted onto the shaft member (the sleeve shaft 2). It is possible to further improve the insertion workability of the boot member 7 with respect to the shaft member (the sleeve shaft 2).

Seventh Embodiment

Figure 10:
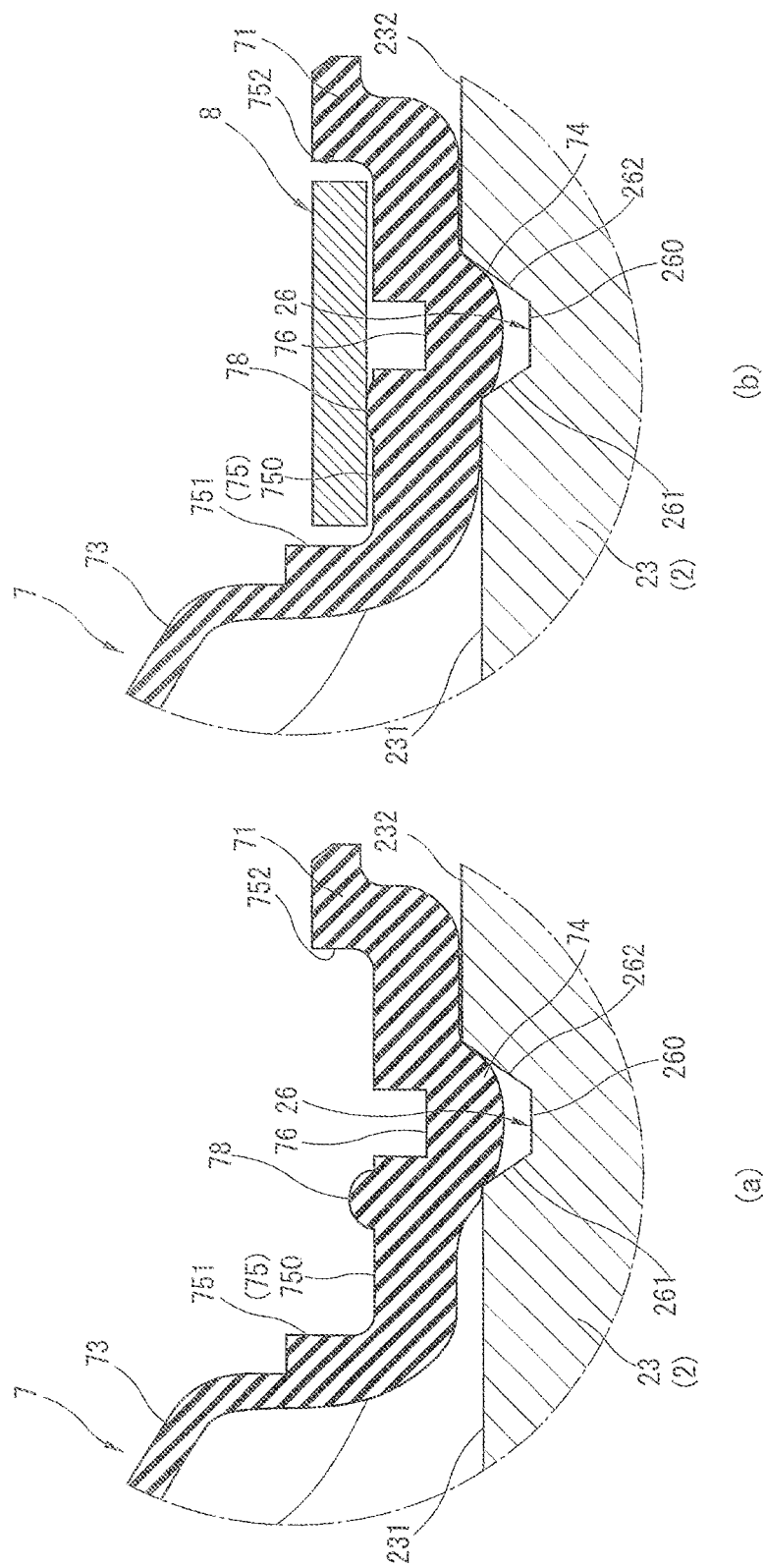
FIG. 10 are partially sectional views showing a propeller shaft according to a seventh embodiment by enlarging the A portion in FIG. 2.

FIG. 10 show a propeller shaft according to a seventh embodiment of the present invention. In this embodiment, the configuration of the boot band tightening portion 75 of the boot member 7 of the propeller shaft PS according to the first embodiment is varied. The basic configuration other than the above-described variation is identical to that of the first embodiment. Accordingly, the configurations identical to those of the first embodiment has the same symbols. Those explanations are omitted. Moreover, for the explanations inn this embodiment, a left side in FIG. 10 is represented as "front", and a right side in FIG. 10 is represented as "rear". A direction along a rotation axis Z in FIG. 10 is represented as "axial direction". A direction perpendicular to the rotation axis Z is represented as "radial direction". A direction around the rotation axis Z is represented as "circumferential direction".

FIG. 10 is an enlarged view showing a main portion of the propeller shaft PS according to the fifth embodiment of the present invention by enlarging the A portion of FIG. 2, similarly to FIG. 3. FIG. 10(a) shows a state before the boot band 8 is tightened. FIG. 10(b) shows a state after the boot band 8 is tightened.

In this embodiment, as shown in FIG. 10(a), the bottom portion 750 of the boot band tightening portion 75 includes a tightening portion side protruding portion 78 which protrudes toward the outside (the boot band 8 side) in the radial direction in a free state of the boot member 7 before the boot band 8 is tightened, and which is integrally provided with the first mounting base portion 71. The tightening portion side protruding portion 78 is provided on the opening edge portion of the mounting groove 26 on the first outside diameter 231 side on the bottom portion 750 of the boot band tightening portion 75. The tightening portion side protruding portion 78 is an annular protrusion which has an arc section in the axial direction (arc longitudinal section), and which is continuously formed in the circumferential direction.

As shown in FIG. 10(b), when the boot band 8 is tightened on the boot band tightening portion 75 of the first mounting base portion 71, the tightening portion side protruding portion 78 is crushed and deformed by the tightening force (the biding force). That is, it is possible to improve the tightening force (the biding force) of the boot band 8 by the reaction force based on the crushing deformation of the tightening portion side protruding portion 78.

As described above, in this embodiment, the boot band tightening portion 75 includes the tightening portion side protruding portion 78 protruding toward the boot band 8.

In this way, the boot band tightening portion 75 includes the tightening portion side protruding portion 78. With this, when the boot band 8 is tightened on the first mounting base portion 71 of the boot member 7, it is possible to increase the tightening force (the biding force) of the boot band 8 by the reaction force of the boot member 7 (the boot band tightening portion 75) based on the crushing deformation of the tightening portion side protruding portion 78. Consequently, it is possible to further improve the sealing ability of the first mounting base portion 71 of the boot member 7.

Moreover, in this embodiment, the tightening portion side protruding portion 78 is provided on the opening edge portion of the mounting groove 26 on the first outside diameter portion 231 side in the boot band tightening portion 75. With this, it is possible to improve, in particular, the sealing ability between the first mounting base portion 71 and the first outside diameter portion 231. It is possible to effectively dam the water entering from the opening portion side of the first mounting base portion 71.

Furthermore, the tightening portion side protruding portion 78 is provided on the opening edge portion of the mounting groove 26 on the first outside diameter portion 231 side on the bottom portion 759 of the boot band tightening portion 75. With this, the tightening force (the binding force) of the boot band more largely acts through the tightening portion side protruding portion 78 on the protruding portion 74. With this, it is possible to improve the sealing ability between the first mounting base portion 71 and the first outside diameter portion 231. It is possible to effectively dam the water entering from the opening portion side of the first mounting base portion 71.

Eighth Embodiment

Figure 11:
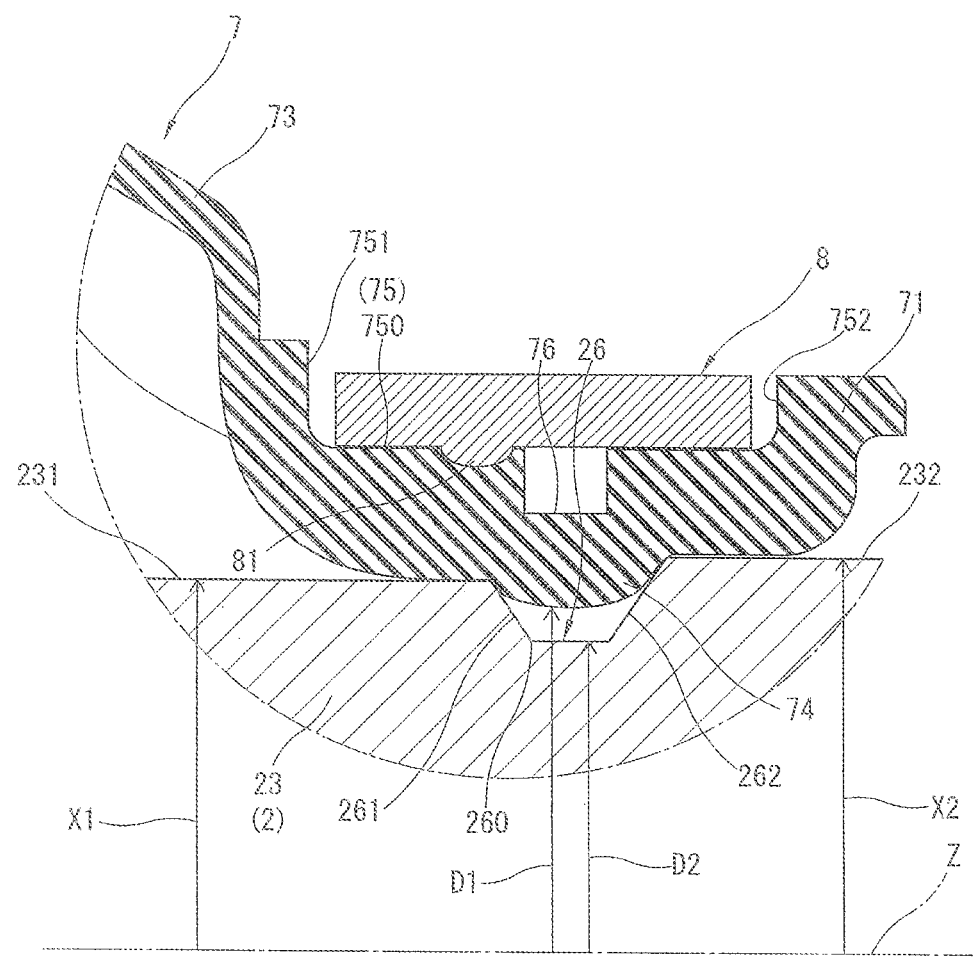
FIG. 11 is a partially sectional view showing a propeller shaft according to an eighth embodiment by enlarging the A portion in FIG. 2.

FIG. 11 shows a propeller shaft according to an eighth embodiment of the present invention. In this embodiment, the configuration of the boot band 8 of the propeller shaft PS according to the first embodiment is varied. The basic configuration other than the above-described variation is identical to that of the first embodiment. Accordingly, the configurations identical to those of the first embodiment has the same symbols. Those explanations are omitted. Moreover, for the explanations inn this embodiment, a left side in FIG. 11 is represented as "front", and a right side in FIG. 11 is represented as "rear". A direction along a rotation axis Z in FIG. 11 is represented as "axial direction". A direction perpendicular to the rotation axis Z is represented as "radial direction". A direction around the rotation axis Z is represented as "circumferential direction".

FIG. 11 is an enlarged view showing a main portion of the propeller shaft PS according to the eighth embodiment of the present invention by enlarging the A portion of FIG. 2, similarly to FIG. 3.

In this embodiment, as shown in FIG. 11, a band side protruding portion 81 is provided on a surface of the boot band 8 confronting the boot band tightening portion 75. The band side protruding portion 81 protrudes in the radially inward direction (toward the boot band tightening portion 75 side). The band side protruding portion 81 is integrally provided with the boot band 8. The band side protruding portion 81 is provided on the inner circumference surface of the boot band 8 at an axial position corresponding to the opening edge portion of the mounting groove 26 on the first outside diameter portion 231. The band side protruding portion 81 is an annular protrusion which has an annular protrusion which has an arc section in the axial direction (arc longitudinal section), and which is continuously formed in the circumferential direction.

As shown in FIG. 11, when the boot band 8 is tightened on the boot band tightening portion 75 of the first mounting base portion 71, the band side protruding portion 81 is bit into the bottom portion 750 of the boot band tightening portion 75. That is, it is possible to improve the tightening force (the biding force) of the boot band 8 by the reaction force based on the biting force of the band side protruding portion 81.

As described above, in this embodiment, the boot band 8 includes the band side protruding portion 81 which is provided on the surface confronting the boot band tightening portion 75, and which protrudes toward the boot band tightening portion 75.

In this way, the band side protruding portion 81 is provided on the inner circumference surface of the boot band 8. With this, when the boot band 8 is tightened on the first mounting base portion 71 of the boot member 7, it is possible to increase the tightening force (the biding force) of the boot band 8 by the biting of the band side protruding portion 81. Consequently, it is possible to further improve the sealing ability of the first mounting base portion 71 of the boot member 7.

Moreover, in this embodiment, the band side protruding portion 81 is provided at an axial position confronting the opening edge portion of the mounting groove 26 on the first outside diameter portion 231 on the bottom portion 50 of the boot band tightening portion 75. With this, it is possible to improve, in particular, the sealing ability between the first mounting base portion 71 and the first outside diameter portion 231. It is possible to more effectively dam the water entering from the opening portion side of the first mounting base portion 71.

Furthermore, the band side protruding portion 81 is provided at an axial position confronting the opening edge portion of the mounting groove 26 on the first outside diameter portion 231 on the bottom portion 50 of the boot band tightening portion 75. With this, the tightening force (the binding force) of the boot band more largely acts through the band side protruding portion 81 on the protruding portion 74. With this, it is possible to improve the sealing ability between the first mounting base portion 71 and the first outside diameter portion 231. It is possible to more effectively dam the water entering from the opening portion side of the first mounting base portion 71.

The present invention is not limited to the configurations and the aspects exemplified in the embodiments. It is possible to freely vary in accordance with the specification of the applied device and the cost as long as it is possible to attain the above-described effects and operations of the present invention.

For example, in the embodiments, the first shaft portion (not shown) is the output shaft of the transmission of the vehicle. The second shaft portion (not shown) is the input shaft of the differential. However, the first shaft portion and the second shaft portion may be reversed.

Moreover, in a vehicle in which the transmission is provided on the driving wheels (the rear wheel), the first shaft portion may be the output shaft of the engine, and the second shaft portion may be the input shaft of the transmission. Furthermore, the first shaft portion and the second shaft portion may be reversed.

Moreover, the present invention is applicable to a vehicle in which an electric motor is used as the continuously variable speed reduction device, in place of the transmission.

Furthermore, in the embodiments, the first mounting base portion 71 side of the boot member 7 is explained in a configuration in which the shaft member according to the present invention is the sleeve shaft 2, and in which the first mounting base portion 71 of the boot member 7 is inserted and mounted on the sleeve shaft 2. The mounting configurations of the boot member 7 according to the embodiments are similarly applicable to a configuration of the second mounting base portion 72 side of the boot member 7 in which the shaft member according to the present invention is the stub shaft 3.

The following aspects are conceivable as the propeller shaft according to the above-described embodiments and so on.

That is, A propeller shaft configured to transmit a rotation force from a power source of a vehicle to a wheel of the vehicle, the propeller shaft includes:
  a cylindrical boot member including a protruding portion protruding in a radially inward direction with respect to a rotation axis of the boot member, and a boot band tightening portion provided on a side opposite to the protruding portion in the radial direction, and recessed toward the rotation axis;
  a shaft member which is inserted into the boot member, and which includes a first outside diameter portion, a groove portion, and a second outside diameter portion which are disposed in this order from a tip end portion of the shaft member in the rotation axis direction,
  the first diameter portion having an outside diameter greater than an inside diameter of the protruding portion,
  the groove portion which has an outside diameter smaller than the outside diameter of the first outside diameter portion, and in which the protruding portion is received, and
  the second outside diameter portion having an outside diameter greater than the outside diameter of the first outside diameter portion; and
  a boot band tightened on the boot band tightening portion.

In a preferable aspect of the propeller shaft, the shaft member includes a first connection portion connected with a groove bottom portion of the groove portion and the first outside diameter portion, and a second connection portion connected with the groove bottom portion of the groove portion and the second outside diameter portion; a length from the rotation axis to the first connection portion in the radial direction is gently shorter from the first outside diameter portion toward the groove bottom portion of the groove portion in the rotation axis direction; a length from the rotation axis to the second connection portion in the radial direction is gently longer from the groove bottom portion of the groove portion toward the second outside diameter portion in the rotation axis direction;
  the boot member includes a first abutment portion abutted on the first connection portion and a second abutment portion abutted on the second connection portion; and a length from the rotation axis to the first abutment portion is shorter than a length from the rotation axis to the second abutment portion.

In another preferable aspect, in one of the aspects of the above-described propeller shaft, an angle formed by the groove bottom portion of the groove portion and the first connection portion is smaller than an angle formed by the groove bottom portion of the groove portion and the second connection portion when viewed from a section perpendicular to the rotation axis of the boot member.

In another preferable aspect, in one of the aspects of the above-described propeller shaft, the boot band is made from a resin material.

In still another preferable aspect, in one of the aspects of the above-described propeller shaft, the shaft member includes a raised portion which is formed between the first outside diameter portion and the groove portion in the rotation axis direction, and which has a diameter that is greater than an outside diameter of the first outside diameter portion, and that is smaller than an outside diameter of the second outside diameter portion.

In still another preferable aspect, in one of the aspects of the above-described propeller shaft, the boot band tightening portion includes a first end portion provided on the first outside diameter portion side in the rotation axis direction, a second end portion provided on the second outside diameter portion side in the rotation axis direction, and the recessed portion recessed in the radially inward direction; the second width portion which is a width from the recessed portion to the second end portion is longer than the first width portion which is a width from the recessed portion to the first end portion, in the rotation axis direction.

In still another preferable aspect, in one of the aspects of the above-described propeller shaft, the inner circumference surface of the protruding portion of the boot member 7 has a shape corresponding to the outer circumference surface of the mounting groove.

In still another preferable aspect, in one of the aspects of the above-described propeller shaft, the boot band tightening portion includes a first recessed portion recessed in the radially inward direction; and a second recessed portion which is connected to the first recessed portion, and which is recessed in the radially inward direction to have a depth smaller than a depth of the first recessed portion.

In another preferable aspect, in one of the aspects of the above-described propeller shaft, the boot band tightening portion includes a tightening portion side protruding portion protruding toward the boot band.

In still another preferable aspect, in one of the aspects of the above-described propeller shaft, the boot band includes a band side protruding portion which is provided on the surface confronting the boot band tightening portion, and which protrudes toward the boot band tightening portion.

The following aspects are conceivable as the manufacturing method for the propeller shaft according to the above-described embodiments and so on.

That is, manufacturing method of a propeller shaft including a rod member, a cylindrical boot member which is mounted to the rod member, and which includes a protruding portion protruding in a radial direction with respect to a rotation axis of the boot member toward the rotation axis, and a boot band tightening portion provided on a side opposite to the protruding portion in the radial direction, and recessed toward the rotation axis, and a cylindrical shaft member into which a tip end portion of the rod member is inserted, and which includes a portion covered by the boot member, which includes a first outside diameter portion, a groove portion, and a second outside diameter portion which are disposed in this order from a tip end portion of the shaft member in the rotation axis direction, the first diameter portion having an outside diameter greater than an inside diameter of the protruding portion, the groove portion which has an outside diameter smaller than the outside diameter of the first outside diameter portion, and in which the protruding portion is received, and the second outside diameter portion having an outside diameter greater than the outside diameter of the first outside diameter portion, the manufacturing method includes;
- a first process of mounting the boot member to the rod member;
- a second process of inserting the rod member into an inner circumference surface of the shaft member; and
- a third process mounting the protruding portion in the mounting groove.

In a preferable aspect of the manufacturing method of the propeller shaft, the boot member is formed by the blow molding.

In another preferable aspect, in one of the aspects of the above-described propeller shaft, the mounting groove in which the protruding portion is mounted is formed on an outer circumference surface of the rod member.

The invention claimed is:

1. A propeller shaft configured to transmit a rotation force from a power source of a vehicle to a wheel of the vehicle, the propeller shaft comprising:
   a cylindrical boot member including a protruding portion protruding in a radially inward direction with respect to a rotation axis of the boot member, and a boot band tightening portion provided on a side opposite to the protruding portion in the radial direction and recessed toward the rotation axis;
   a shaft member which is inserted into the boot member and which includes a first outside diameter portion, a groove portion, and a second outside diameter portion which are disposed in this order from a tip end portion of the shaft member in the rotation axis direction,
   the first outside diameter portion having an outside diameter greater than an inside diameter of the protruding portion,
   the groove portion which has an outside diameter smaller than the outside diameter of the first outside diameter portion and in which the protruding portion is received, and
   the second outside diameter portion having an outside diameter greater than the outside diameter of the first outside diameter portion; and
   a boot band tightened on the boot band tightening portion, wherein
   the shaft member includes a first connection portion connected with a groove bottom portion of the groove portion and the first outside diameter portion, and a second connection portion connected with the groove bottom portion of the groove portion and the second outside diameter portion, wherein
   a length from the rotation axis to the first connection portion in the radial direction is gradually shorter from the first outside diameter portion toward the groove bottom portion of the groove portion in the rotation axis direction, and
   a length from the rotation axis to the second connection portion in the radial direction is gradually longer from the groove bottom portion of the groove portion toward the second outside diameter portion in the rotation axis direction, and
   the boot member includes a first abutment portion abutted on the first connection portion and a second abutment portion abutted on the second connection portion, wherein
   a length from the rotation axis to the first abutment portion is shorter than a lengthy from the rotation axis to the second abutment portion.

2. The propeller shaft as claimed in claim 1, wherein an angle formed by the groove bottom portion of the groove portion and the first connection portion is smaller than an angle formed by the groove bottom portion of the groove portion and the second connection portion when viewed from a section perpendicular to the rotation axis of the boot member.

3. The propeller shaft as claimed in claim 1, wherein the boot band is made from a resin material.

4. The propeller shaft as claimed in claim 3, wherein the shaft member includes a raised portion which is formed between the first outside diameter portion and the groove portion in the rotation axis direction, and which has a diameter that is greater than an outside diameter of the first outside diameter portion, and that is smaller than an outside diameter of the second outside diameter portion.

5. The propeller shaft as claimed in claim 1, wherein the boot band tightening portion includes a first end portion provided on the first outside diameter portion side in the rotation axis direction, a second end portion provided on the second outside diameter portion side in the rotation axis direction, and the recessed portion recessed in the radially inward direction; the second width portion which is a width from the recessed portion to the second end portion is longer than the first width portion which is a width from the recessed portion to the first end portion, in the rotation axis direction.

6. The propeller shaft as claimed in claim 1, wherein the inner circumference surface of the protruding portion of the boot member 7 has a shape corresponding to the outer circumference surface of the mounting groove.

7. The propeller shaft as claimed in claim 1, wherein the boot band tightening portion includes a first recessed portion recessed in the radially inward direction; and a second recessed portion which is connected to the first recessed portion, and which is recessed in the radially inward direction to have a depth smaller than a depth of the first recessed portion.

8. The propeller shaft as claimed in claim 1, wherein the boot band tightening portion includes a tightening portion side protruding portion protruding toward the boot band.

9. The propeller shaft as claimed in claim 1, wherein the boot band includes a band side protruding portion which is provided on the surface confronting the boot band tightening portion, and which protrudes toward the boot band tightening portion.

10. A manufacturing method of a propeller shaft,
the propeller shaft including:
a rod member;
a cylindrical boot member which is mounted to the rod member and which includes a protruding portion protruding in a radial direction with respect to a rotation axis of the boot member toward the rotation axis, and a boot band tightening portion provided on a side opposite to the protruding portion in the radial direction, and recessed toward the rotation axis, and
a cylindrical shaft member into which a tip end portion of the rod member is inserted and which includes a portion covered by the boot member and which includes a first outside diameter portion, a mounting groove, and a second outside diameter portion which are disposed in this order from a tip end portion of the shaft member in the rotation axis direction, wherein
the first outside diameter portion having an outside diameter greater than an inside diameter of the protruding portion,
the mounting groove which has an outside diameter smaller than the outside diameter of the first outside diameter portion and in which the protruding portion is received, and
the second outside diameter portion having an outside diameter greater than the outside diameter of the first outside diameter portion,
wherein
the shaft member includes a first connection portion connected with a groove bottom portion of the mounting groove and the first outside diameter portion, and a second connection portion connected with the groove bottom portion of the mounting groove and the second outside diameter portion, wherein
a length from the rotation axis to the first connection portion in the radial direction is gradually shorter from the first outside diameter portion toward the groove bottom portion of the mounting groove in the rotation axis direction, and
a length from the rotation axis to the second connection portion in the radial direction is gradually longer from the groove bottom portion of the mounting groove toward the second outside diameter portion in the rotation axis direction, and
the boot member includes a first abutment portion abutted on the first connection portion and a second abutment portion abutted on the second connection portion, wherein
a length from the rotation axis to the first abutment portion is shorter than a length from the rotation axis to the second abutment portion,
the manufacturing method comprising;
a first process of mounting the boot member to the rod member;
a second process of inserting the rod member into an inner circumference surface of the shaft member; and
a third process mounting the protruding portion in the mounting groove.

11. The manufacturing method as claimed in claim 10, wherein the boot member is formed by the blow molding.

12. The manufacturing method as claimed in claim 11, wherein:
another protruding portion is further provided at the boot member, and
a mounting groove in which said another protruding portion of the boot member is mounted is formed on an outer circumference surface of the rod member.

* * * * *